United States Patent
Yamanaka et al.

(12) 
(10) Patent No.: US 7,435,465 B2
(45) Date of Patent: *Oct. 14, 2008

(54) FILM-LAMINATED METAL SHEET FOR CONTAINER

(75) Inventors: Yoichiro Yamanaka, Fukuyama (JP); Hiroki Iwasa, Fukuyama (JP); Shinsuke Watanabe, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 11/360,210

(22) Filed: Feb. 23, 2006

(65) Prior Publication Data

US 2006/0147733 A1 Jul. 6, 2006

Related U.S. Application Data

(63) Continuation of application No. 10/658,220, filed on Sep. 8, 2003, now Pat. No. 7,198,856, which is a continuation of application No. PCT/JP02/02343, filed on Mar. 13, 2002.

(30) Foreign Application Priority Data

| Mar. 14, 2001 | (JP) | ............................. 2001-071454 |
| Mar. 14, 2001 | (JP) | ............................. 2001-071455 |
| Mar. 14, 2001 | (JP) | ............................. 2001-071456 |
| Mar. 14, 2001 | (JP) | ............................. 2001-071459 |
| Feb. 18, 2002 | (JP) | ............................. 2002-039808 |

(51) Int. Cl.
*B32B 1/08* (2006.01)
*B32B 15/08* (2006.01)

(52) U.S. Cl. ...................... 428/35.9; 428/458

(58) Field of Classification Search ........................ None
See application file for complete search history.

(56) References Cited

U.S. PATENT DOCUMENTS 5,451,304 A 9/1995 Markfort et al.

(Continued)

FOREIGN PATENT DOCUMENTS

EP 1 174 457 A1 1/2002

(Continued)

OTHER PUBLICATIONS

Machine translation of JP 07-109363, Kuze et al., Apr. 1995.*

(Continued)

*Primary Examiner*—Holly Rickman
(74) *Attorney, Agent, or Firm*—Frishauf, Holtz, Goodman & Chick, P.C.

(57) ABSTRACT

A film-laminated metal sheet for a container having laminated resin films, each resin film containing a polyester as a main component on an inner surface thereof and an outer surface thereof, wherein a polarity force component $Ys^h$ of a surface free energy of a surface of the resin film that is to be positioned on an inner surface side of the container after formation of the container and that is to be in contact with a content of the container is $4 \times 10^{-3}$ N/m or less, the resin film to be positioned on the inner surface side of the container after formation of the container and/or a resin film to be positioned on the outer surface side of the container after formation of the container contains a color pigment or a color dye.

2 Claims, 1 Drawing Sheet

U.S. PATENT DOCUMENTS

| | | |
|---|---|---|
| 5,753,328 A | 5/1998 | Miyazawa et al. |
| 6,217,994 B1 | 4/2001 | Tanaka |
| 7,198,856 B2 * | 4/2007 | Yamanaka et al. .......... 428/458 |

FOREIGN PATENT DOCUMENTS

| | | |
|---|---|---|
| JP | 63-236640 A | 10/1988 |
| JP | 5-200961 A | 8/1993 |
| JP | 7-109363 A | 4/1995 |
| JP | 9-123352 A | 5/1997 |
| JP | 2000-158583 A | 6/2000 |
| JP | 2000-158584 A | 6/2000 |
| JP | 2000-158585 A | 6/2000 |
| JP | 2000-158586 A | 6/2000 |
| JP | 2000-158588 A | 6/2000 |

OTHER PUBLICATIONS

"Determination of Surface Free Energies of Talc From Contact Angles Measured On Flat and Powdered Samples," available at http://scholar.lib/vt.edu/theses/available/etd-05042001-163337/un-restricted/03chapter2.pdf.

* cited by examiner

FILM-LAMINATED METAL SHEET FOR CONTAINER

CROSS-REFERENCE TO RELATED APPLICATIONS

This application is a continuation application of Ser. No. 10/658,220 filed Sep. 8, 2003, (U.S. Pat. No. 7,198,856), which is a continuation of International application PCT/JP02/02343 filed Mar. 13, 2002.

BACKGROUND OF THE INVENTION

1. Field of the Invention

The present invention relates to a film-laminated metal sheet for a container. More specifically, the present invention relates to a film-laminated metal sheet used to form bodies and lids of food cans.

2. Background Art

Conventionally, coating is applied to metal can materials, such as tin free steels (TFSs) and aluminium, used for food cans. However, the technique employing such coating application has problems as it not only involves a complicated baking step, but also requires much processing time, and further, discharges much solvent. To solve these problems, many techniques have been proposed in which a thermoplastic resin film is laminated over a heated metal sheet.

Many of the proposals relate to improvement in adhesion property and formability of a film and a metal sheet used as a base material. The proposed techniques can be briefed such that the technical concepts thereof concern: (1) use of a film (such as a polyester resin film) having a polar group (as disclosed in, for example, Japanese Unexamined Patent Application Publication No. 63-236640); and (2) an increase in surface free energy represented by, for example, activation by processing such as the process of corona discharge to a film surface (as disclosed in, for example, Japanese Unexamined Patent Application Publication No. 05-200961). Japanese Unexamined Patent Application Publication No. 05-200961 discloses in detail that the film-surface free energy is controlled to a range of $(38$ to $54) \times 10^{-3}$ N/m (38 to 54 dyn/cm) to secure, for example, post-fabrication adhesion property of a polyethylene-resin coated metal sheet.

However, in the technique using the laminate metal sheet proposed as in the above-referenced publication for food cans, when attempting to release a content substance from the container, a problem takes place in that since the content substance strongly adheres to the inner surface of the container, the content substance cannot easily be released. This problem relates to purchase motivation of consumers. As such, improving releasability of the content substance is very important. However, conventionally, no considerations have been made to improve the releasability of the content substance.

SUMMARY OF THE INVENTION

It is an object of the present invention to provide a film-laminated metal sheet for container that enables sufficient content-substance releasability to be secured and that has both formability and adhesion property required in the container fabrication processing.

In order to achieve the object, according to a first aspect, the present invention provides a film-laminated metal sheet for container, more specifically, a film-laminated metal sheet for container including resin films each containing polyester as a main component in two surfaces, wherein a polarity force component $\gamma s^h$ of a surface free energy of a surface where the resin film to be positioned on an inner surface side of the container after formation of the container and is to be in contact with the content is $4 \times 10^{-3}$ N/m or less.

The resin film to be positioned on the inner surface side of the container after formation of the container is preferably a resin film blended with 5 to 20% in a ratio by mass of an olefin resin with respect to the resin film.

Further, the resin film to be positioned on the inner surface side of the container is preferably a resin film containing 0.1 to 2% in a ratio by mass of a wax component with respect to the resin film. The wax component is preferably carnauba wax or ester stearate.

The resin film containing polyester as a main component is preferably any one of:

(A) a biaxially oriented polyester film in which a relaxation time T1ρ of a benzene ring carbon at a 1,4 coordinate in a structure analysis according to a high solid resolution. NMR is 150 msec or longer;

(B) a biaxially oriented polyester film characterized in that a melting point is 240 to 300° C., the content substance of a terminal carboxyl group is 10 to 50 equivalent/ton, and an isophthalic acid component is not substantially contained as an acid component; and (C) a biaxially oriented polyester film characterized in that an amorphous Young's modulus is in a range of 120 to 220 kg/mm².

The resin film containing polyester as a main component is preferably be any one of:

(a) a resin film characterized in that 95 mol % or more of polyester units constituting the resin film containing polyester as a main component are ethylene terephthalate units;

(b) a biaxially oriented polyester film characterized in that 93 mol % or more of the polyester units constituting the resin film containing polyester as a main component are ethylene terephthalate units, and a crystal size χ in a (100) plane obtained through an X-ray diffraction measurement is 6.0 nm or smaller; and (c) a biaxially oriented polyester film characterized in that 93 mol % or more of the polyester units constituting the resin film containing polyester as a main component are ethylene terephthalate units, and a crystal orientation parameter R obtained through an X-ray diffraction measurement is $20 \times 10^{-2}$ or greater.

A region where the birefringence of a laminate layer to be positioned on the inner surface side of the container after formation of the container is 0.02 or lower is preferably smaller than 5 μm from a contact interface with the metal sheet in the thickness direction.

The resin film to be positioned on the inner surface side of the container after formation of the container preferably contains a color pigment or a color dye. In addition, the resin film to be positioned on an outer surface side of the container after formation of the container preferably contains a color pigment or a color dye.

According to a second aspect, the invention provides a film-laminated metal sheet for container, specifically, a film-laminated metal sheet for container including resin films each containing polyester as a main component in two surfaces, wherein a polarity force component $\gamma s^h$ of an surface free energy of a surface where the resin film to be positioned on an inner surface side of the container after formation of the container is to be in contact with the content is $2 \times 10^{-3}$ N/m or less.

The resin film to be positioned on the inner surface side of the container after formation of the container is preferably a resin film blended with 10 to 20% in a ratio by mass of an olefin resin with respect to the resin film.

Further, the resin film to be positioned on the inner surface side of the container is preferably a resin film containing 0.8 to 2% in a ratio by mass of a wax component with respect to the resin film. The wax component is preferably carnauba wax or ester stearate.

The resin film containing polyester as a main component is preferably any one of:

(A) a biaxially oriented polyester film formed such that a relaxation time T1ρ of a benzene ring carbon at a 1,4 coordinate in a structure analysis according to a high solid resolution NMR is 150 msec or longer;

(B) a biaxially oriented polyester film formed such that a melting point is 240 to 300° C., the content of a terminal carboxyl group is 10 to 50 equivalent/ton, and an isophthalic acid component is not substantially contained as an acid component; and (C) a biaxially oriented polyester film formed such that an amorphous Young's modulus is 120 to 220 kg/mm$^2$.

The resin film containing polyester as a main component is preferably be any one of:

(a) a resin film formed such that 95 mol % or more of polyester units constituting the resin film containing polyester as a main component are ethylene terephthalate units;

(b) a biaxially oriented polyester film formed such that 93 mol % or more of the polyester units constituting the resin film containing polyester as a main component are ethylene terephthalate units, and a crystal size χ in a (100) plane obtained through X-ray diffraction measurement is 6.0 nm or smaller; and (c) a biaxially oriented polyester film formed such that 93 mol % or more of the polyester units constituting the resin film containing polyester as a main component are ethylene terephthalate units, and a crystal orientation parameter R obtained through an X-ray diffraction measurement is $20 \times 10^{-2}$ or greater.

A region where the birefringence of a laminate layer to be positioned on the inner surface side of the container after formation of the container is 0.02 or lower is preferably smaller than 5 μm from a contact interface with the metal sheet in the thickness direction.

The resin film to be positioned on the inner surface side of the container after formation of the container preferably contains a color pigment or a color dye. In addition, the resin film to be positioned on an outer surface side of the container after formation of the container preferably contains a color pigment or a color dye.

According to a third aspect, the invention provides a film-laminated metal sheet for container including resin films each containing polyester as a main component in two surfaces, wherein the resin film to be positioned on an inner surface side of the container after formation of the container is constituted of at least one or more layers, and the resin film to be positioned on an outer surface side of the container after formation of the container. A polarity force component $\gamma s^h$ of an surface free energy of a surface where an uppermost-layer resin film of the at least two or more resin films, which is to be positioned on the inner surface side of the container after formation of the container, is to be in contact with the content is $4 \times 10^{-3}$ N/m or less.

The uppermost-layer resin film is preferably a resin film blended with 5 to 20% in a ratio by mass of an olefin resin with respect to the uppermost-layer resin film.

Further, the uppermost-layer resin film is preferably a resin film containing 0.1 to 2% in a ratio by mass of a wax component with respect to the uppermost-layer resin film. The wax component is preferably carnauba wax or ester stearate.

At least one of the at least one or more resin films to be positioned on the inner surface side of the container after formation of the container preferably contains a color pigment or a color dye. In addition, at least one of the at least one or more resin films to be positioned resin film positioned on the outer surface side of the container after formation of the container preferably contains a color pigment or a color dye.

According to a fourth aspect, the invention provides a film-laminated metal sheet for container including resin films each containing polyester as a main component in two surfaces, wherein the resin film to be positioned on an inner surface side of the container after formation of the container is constituted of at least one or more layers, and the resin film to be positioned on an outer surface side of the container after formation of the container. A polarity force component $\gamma s^h$ of an surface free energy of the surface of an uppermost-layer resin film of the at least two or more resin films, which is to be positioned on the inner surface side of the container after formation of the container, is to be in contact with the content is $2 \times 10^{-3}$ N/m or less.

The uppermost-layer resin film is preferably a resin film blended with 10 to 20% in a ratio by mass of an olefin resin with respect to the resin film.

Further, the uppermost-layer resin film is preferably a resin film containing 0.8 to 2% in a ratio by mass of a wax component with respect to the uppermost resin film. The wax component is preferably carnauba wax or ester stearate.

At least one of the at least one or more resin films to be positioned on the inner surface side of the container after formation of the container preferably contains a color pigment or a color dye. In addition, at least one of the at least one or more resin films to be positioned resin film to be positioned on the outer surface side of the container after formation of the container preferably contains a color pigment or a color dye.

The color pigment may be any one of those listed as follows:

(a) color pigment containing an aromatic-group diamine based organic pigment;

(b) color pigment containing a benzimidazolone based organic pigment;

(c) color pigment containing a 1:2 complex chromate and phthalocyanine; and (d) color pigment composed by mixing a 1:2 complex chromate and phthalocyanine at a mass ratio of 10:1.

DETAILED DESCRIPTION OF THE INVENTION

Embodiment 1

Figure 1:
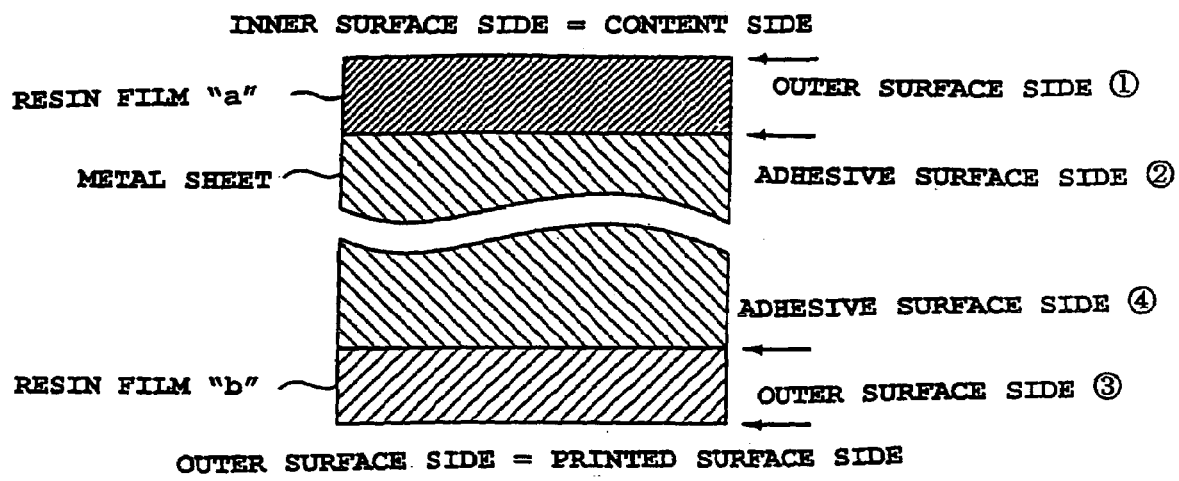
FIG. 1 is a cross-sectional schematic of a film laminate metal sheet according to Embodiment 1.

The inventors discovered that control of a polarity force component $\gamma s^h$ of a surface free energy of the surface of the film is important, and controlling the value of the component into an appropriate range of numeric values enables sufficient content-substance releasability to be secured and enables the provision of a film-laminated metal sheet for container that has both formability and adhesion property required in the container fabrication processing.

Specifically, essentials of Embodiment 1 are described hereunder.

(1) A film-laminated metal sheet for container including resin films each containing polyester as a main component in two surfaces, wherein a polarity force component $\gamma s^h$ of an surface free energy of a surface where the resin film to be positioned on an inner surface side of the container after formation of the container is to be in contact with the content substance is $4 \times 10^{-3}$ N/m or less.

(2) A film-laminated metal sheet for container characterized by including resin films each containing polyester as a main component in two surfaces, wherein a polarity force component $\gamma s^h$ of an surface free energy of a surface where the resin film to be positioned on an inner surface side of the container after formation of the container is to be in contact with the content substance is $2 \times 10^{-3}$ N/m or less.

(3) A film-laminated metal sheet for container according to (1), characterized in that the resin film to be positioned on the inner surface side of the container after formation of the container is a resin film that contains polyester as a main component and that is blended with 5.0 to 20.0% in a ratio by mass of an olefin resin with respect to the resin film.

(4) A film-laminated metal sheet for container according to (1), characterized in that the resin film to be positioned on the inner surface side of the container is a resin film that contains polyester as a main component and that contains 0.10 to 2.0% in a ratio by mass of a wax component with respect to the resin film.

(5) A film-laminated metal sheet for container according to (2), characterized in that the resin film to be positioned on the inner surface side of the container after formation of the container is a resin film that contains polyester as a main component and that is blended with 10.0 to 20.0% in a ratio by mass of an olefin resin with respect to the resin film.

(6) A film-laminated metal sheet for container according to (2), characterized in that the resin film to be positioned on the inner surface side of the container is a resin film that contains polyester as a main component and that contains 0.80 to 2.0% in a ratio by mass of a wax component with respect to the resin film.

(7) A film-laminated metal sheet for container according to (1), characterized in that the resin film containing polyester as a main component is a resin film that is constituted of at least one or more layers and that is formed such that an olefin resin is blended only with an uppermost layer that is to be in contact with the content substance, and 5.0 to 20.0% in a ratio by mass of the olefin resin with respect to the film constituting the uppermost layer of the resin film is blended.

(8) A film-laminated metal sheet for container according to (2), characterized in that the resin film containing polyester as a main component is a resin film that is constituted of at least one or more layers and that is formed such that an olefin resin is blended only with an uppermost layer that is to be in contact with the content substance, and 10.0 to 20.0% in a ratio by mass of the olefin resin with respect to the film constituting the uppermost layer of the resin film is blended.

(9) A film-laminated metal sheet for container according to (1), characterized in that the resin film containing polyester as a main component is a resin film that is constituted of at least one or more layers and that is formed such that a wax component is added to an uppermost layer that is to be in contact with the content substance, and 0.10 to 2.0% in a ratio by mass of the wax component with respect to the film constituting the uppermost layer of the resin film is added thereto.

(10) A film-laminated metal sheet for container according to (2), characterized in that the resin film containing polyester as a main component is a resin film that is constituted of at least one or more layers and that is formed such that a wax component is added to an uppermost layer that is to be in contact with the content substance, and 0.80 to 2.0% in a ratio by mass of the wax component with respect to the film constituting the uppermost layer of the resin film is added thereto.

(11) A film-laminated metal sheet for container according to (4), (6), (9) or (10), characterized by containing carnauba wax or ester stearate as the wax component.

(12) A film-laminated metal sheet for container according to any one of (1) to (11), characterized in that the resin film containing polyester as a main component is a biaxially oriented polyester film formed such that a relaxation time T1ρ of a benzene ring carbon at a 1,4 coordinate in a structure analysis according to a high solid resolution NMR is 150 m/sec or longer;

(13) A film-laminated metal sheet for container according to any one of (1) to (12), characterized in that an region where the birefringence of a laminate layer to be positioned on the inner surface side of the container after formation of the container is 0.02 or lower is smaller than 5 μm from a contact interface with the metal sheet in the thickness direction.

(14) A film-laminated metal sheet for container according to any one of (1) to (13), characterized in that a color pigment or a color dye is added into the resin film that is to be positioned on the inner surface side of the container after formation of the container (at least one of the layers in the case where the film is constituted of two or more layers) and/or the resin film that contains polyester as a main component and that is to be positioned resin film positioned on an outer surface side of the container after formation of the container (at least one of the layers in the case where the film is constituted of two or more layers).

(15) A film-laminated metal sheet for container according to (14), characterized in that the added color pigment contains an aromatic-group diamine based organic pigment.

(16) A film-laminated metal sheet for container according to (14), characterized in that the added color pigment contains a benzimidazolone based organic pigment.

(17) A film-laminated metal sheet for container according to (14), characterized in that the added color pigment contains a 1:2 complex chromate and phthalocyanine.

(18) A film-laminated metal sheet for container according to (14), characterized in that the added color pigment is composed by mixing a 1:2 complex chromate and phthalocyanine at a mass ratio of 10:1.

FIG. 1 is a cross-sectional schematic of a film laminate metal sheet according to Embodiment 1. In FIG. 1 are shown a resin film (a) to be positioned on an inner surface side of a container after formation of the container, and a resin film (b) to be positioned on an outer surface side of the container after formation of the container.

As a resin film to be laminated on each of the two surfaces of the metal sheet, Embodiment 1 uses a resin film containing polyester as a main component. The polyester, which is used as a main component of the resin film, is a polymer composed of a dicarboxylic acid component and a glycol component. Usable examples of the dicarboxylic acid component include a terephthalic acid, an isophthalic acid, a naphthalenedicarboxylic acid, diphenyl-dicarboxylic acid or the like may be used. Particularly, the terephthalic acid or phthalic acid may preferably bemused. The glycol component may be any one of, for example, ethylene glycol, propane diol, butane diol, or the like. Particularly, ethylene glycol is preferable. For the dicarboxylic acid component and the glycol component, two or more types of the components may be combined for use. In addition, an antioxydant, thermal stabilizer, ultraviolet ray absorbent, a placticizer, a pigment, an antistatic agent, a crystallization core agent, and the like may be blended on an as-and-when-necessary basis.

The polyester thus composed is excellent in mechanical properties, such as tensile strength, elasticity, and impact strength; in addition, the polyester has a polarity. Accordingly, using the polyester as a main component enables the film to be improved in adhesion property and formability to the level of being able to sustain container fabrication processing. In addition, an impact resistance can be imparted thereby to the film.

The inventors performed extensive researches and investigations regarding releasability of a content substance of a food container (food can) formed with the film-laminated metal sheet as the material. As a result, the inventors discovered that the content-substance releasability is correlated with a surface free energy of the laminate metal sheet, and the releasability of the content substance can be enhanced by reducing the surface free energy. More specifically, high content-substance releasability can be attained by controlling the surface free energy of the laminate metal sheet to be $30 \times 10^{-3}$ N/m (30 dyn/cm) or lower. The surface free energy is substantially the same in value as a surface tension of a substance; and wettability and adhesion are increased as the value of the energy increases. It is contemplated that reduction in the surface free energy caused the adhesion between the content substance and the laminate metal sheet to be reduced, thereby easing the content substance to be released.

Concurrently, however, the researches and investigation made it clear that, depending on the case, even higher content-substance releasability is required, the laminate metal sheet of the type described above is not sufficient to satisfy the requirements. As such, the inventors performed various researches to further enhance the content-substance releasability. The results made it clear that a polarity force component $\gamma s^h$ of the surface free energy is a governing factor of the content-substance releasability.

The surface free energy is separated into a dispersion force component $\gamma s^d$ and the polarity force component $\gamma s^h$. The dispersion force component $\gamma s^d$ is a so-called Van der Waals force; that is, a central force of a low intermolecule attraction force working as a central force between molecules of all types containing nonpolar molecules. The polarity force component $\gamma s^h$ is a strong interaction force working between polar groups represented by hydrogen bonding.

The polarity force component $\gamma s^h$ is the governing factor of the content-substance releasability, as described above. As such, it is contemplated that interaction forces between polar groups of a content substance and polar groups of a polyethylene terephthalate resin film of the content substance cause the content substance not to easily be released.

Further researches and studies resulted in clarification that even higher content-substance releasability can be attained by controlling the polarity force component $\gamma s^h$ of the surface free energy of the surface of the resin film that is to be positioned on an inner surface side of the container after formation of the container. According to this knowledge, the polarity force component $\gamma s^h$ of the surface free energy is controlled in the invention.

In specific, according to Embodiment 1, with respect to a surface (outer surface side ① of the resin film a in FIG. 1) where the resin film to be positioned on an inner surface side of the container after formation of the container is to be in contact with the content substance, the polarity force component $\gamma s^h$ of the surface free energy is controlled to 4.0 $\times 10^{-3}$ N/m (4.0 dyn/cm) or lower. A reason for controlling to $4.0 \times 10^{-3}$ N/m (4.0 dyn/cm) or lower is that the adhesion between the resin film and the content substance otherwise excessively increases, thereby decreasing the content-substance releasability. To further enhancing the content-substance releasability, the polarity force component $\gamma s^h$ is preferably $2.0 \times 10^{-3}$ N/m (2.0 dyn/cm) or lower.

In general, processing of decreasing the surface free energy decreases both the dispersion force component $\gamma s^d$ and the polarity force component $\gamma s^h$. Exceptionally, however, only one of the dispersion force component $\gamma s^d$ and the polarity force component $\gamma s^h$ can be caused to decrease.

The polarity force component $\gamma s^h$ of the film-surface free energy almost does not vary before and after lamination. As such, the laminate metal sheet of the Embodiment 1 can be obtained in such a manner that a film preliminarily processed to have the polarity force component $\gamma s^h$ of the surface free energy within the inventive range is prepare, and the film is laminated over a metal sheet. The polarity force component $\gamma s^h$ of the surface free energy of the film can be controlled to be within the range defined in Embodiment 1 in a way that an olefin resin is blended with a resin film or wax is added to a resin film.

In Embodiment 1, the resin film to be positioned on the inner surface side of the container after formation of the container is restricted to be of a type formed by blending an olefin resin and a polyester resin. The olefin resin can thus be blended to decrease the polarity force component $\gamma s^h$ of the surface free energy of the film. Thereby, the content substance is not easily adhered to the film surface, consequently leading to a significant enhancement in the content-substance releasability.

A polyethylene resin or an ionomer resin is preferable for the olefin resin to be included. However, the olefin resin is not limited to such the resin, and may be of any type as long as it is usable as a film that offers the polarity force component of the surface free energy that is within the range specified by the invention.

The olefin resin in a range of 5.0 to 20.0% by mass with respect to the polyester resin film is blended. A reason for restricting the ratio of blending the olefin resin to 5% or higher is that a blending ratio lower than 5.0% disables the polarity force component $\gamma s^h$ of the film-surface free energy to decrease to $4.0 \times 10^{-3}$ N/m or less, leading to deterioration in the content-substance releasability. The blending ratio of the olefin resin is preferably 10.0% or higher to reduce the polarity force component $\gamma s^h$ of the surface free energy to a level of $2.0 \times 10^{-3}$ N/m to or less. The mass ratio is limited to 20.0% or lower for the reason that a ratio exceeding 20% causes the content-substance releasability to be substantially saturated and disables a significant effect to be obtained. In addition, the exceeding ratio falls in an range that causes difficulty in film deposition technique, consequently leading to low productivity and high costs.

In Embodiment 1, the resin film to be positioned on the inner surface side of the container after formation of the container is restricted to be of a type of which a main component is polyester containing a wax component. The wax component is added as an addition substance ① to reduce the polarity force component $\gamma s^h$ of the surface free energy and ② to impart lubricity to the surface. The effect of ① makes it difficult for the content substance to adhere to the film, and the effect of ② decreases a friction coefficient of the film surface. These effects enable the content-substance releasability to be significantly enhanced.

For the wax component, an organic or inorganic lubricant material is usable. Particularly, an organic lubricant material such as an aliphatic-acid ester is preferable. A more preferable component is a vegetable-type, natural-type wax, specifically a carnauba wax (a main component thereof is $CH_3(CH_2)_{24}COO(CH_2)_{29}CH_3$, and the wax contains various other components composed of aliphatic groups and alcohol), or ester stearate. Either of these components is preferable as it exhibits significant effects ① and ②, and has a molecular structure allowing easy inclusion into the film; however, the carnauba wax is particularly preferred.

In Embodiment 1, the resin film to be positioned on the inner surface side of the container after formation of the container is restricted to be of a type formed by adding 0.10 to 2.0% in a ratio by mass of a wax component with respect to the resin film. Reasons for restricting the content of the wax component to 0.10% or higher are that, at a ratio lower than 0.10%, the polarity force component $\gamma s^h$ of the surface free energy corresponding to item ① above cannot be reduced to a level of $4.0 \times 10^{-3}$ N/m or less, and the effect of item ② above is deteriorated, whereby the content-substance releasability is deteriorated. The content of the wax component is preferably set to 0.80% or higher to decrease the polarity force component $\gamma s^h$ of the surface free energy to a level of $2.0 \times 10^{-3}$ N/m. The content is limited to 2.0% or lower for the reason that a content exceeding 2.0% causes the content-substance releasability to be substantially saturated and disables a significant effect to be obtained. In addition, the exceeding ratio falls in a range that causes difficulty in film deposition technique, consequently leading to low productivity and high costs.

The polyester film containing the wax can be manufactured by an ordinary deposition technique after the wax is blended with the polyester.

The effects described above cannot be obtained in such a way that a wax component is coated over a film surface. This is because canned foods and the like are subjected to retort processing for infection after the content substance is packaged, and a precoated wax is absorbed into the content substance during the retort processing. However, as in Embodiment 1, in the case where the wax is added to the film, the wax slowly appears over the surface with its density increasing. Consequently, the wax is not absorbed overall into the content substance, therefore enabling the effects described above to be securely exhibited.

The resin film containing polyester as a main component is preferably a biaxially oriented polyester film formed such that a relaxation time T1ρ of a benzene ring carbon at a 1,4 coordinate in a structure analysis according to a high solid resolution NMR is 150 msec or longer. Compared to a non-oriented film, a biaxially oriented film has better features as it is significantly enhanced in properties, such as, tensile strength, impact strength, vapor transmissivity, and gas transmissivity.

The relaxation time T1ρ represents molecule mobility, and increasing the relaxation time T1ρ increases a ligation force in an amorphous region of the film. In the state of the biaxially oriented film, when the relaxation time T1ρ of a benzene ring carbon at a 1,4 coordinate increases, a molecule alignment property at the coordinate is controlled to form a steady structure like a crystal structure, thereby enabling crystallization of the amorphous region during formation. That is, the mobility of the amorphous region is reduced to suppress reorientation behavior for crystallization. When the relaxation time T1ρ is set to 150 msec or longer, the excellent effects described above can be sufficiently exhibited. Further, even when sophisticated processing is performed after lamination, high formability and impact resistance can be secured. In view of the above, the relaxation time T1ρ is preferably 180 msec or longer, more preferably 200 msec or longer.

By way of a technique of setting the relaxation time T1ρ to 150 msec or longer, a high-temperature preheating technique and a high-temperature orientation technique may be combined. However, the method is not specifically limited. For example, the method may be implemented by optimization of factors, such as material-intrinsic viscosities, catalysts, amounts of diethyl glycols, orientation conditions, and heat treatment conditions. The preheating temperature for vertical orientation during the film manufacture is preferably 90° C. or higher, more preferably 100° C. or higher, and still more preferably 110° C. or higher. The orientation temperature is preferably 100° C. or higher, more preferably 110° C. or higher, still more preferably 115° C. or higher.

The film after being laminated over the metal sheet is preferably structured as follows. The laminated resin film (laminate layer) to be positioned on the inner surface side of the container after formation of the container is preferably formed to have a region where the birefringence thereof is 0.02 or lower is smaller than 5 μm from a contact interface with the metal sheet in the thickness direction.

According to an ordinary manufacturing method of a laminate metal sheet, the metal sheet is bonded with a film such that the film is placed in contact with the heated metal sheet, is then compressed thereonto to cause a film resin on a metal sheet interface to melt, and is then wetted on the metal sheet. As such, the film needs to be in a melted state to secure the adhesion property between the film and the metal sheet. Accordingly, the film birefringence of a portion located in contact with the metal sheet after lamination is naturally reduced. As defined in Embodiment 1, if the film birefringence of the portion is 0.02 or lower, the state indicates that the molten-film wet at the time of lamination has been sufficient. Thereby, high adhesion property can be secured.

For the birefringence of the polyester resin described above, values obtained by a measuring method described hereunder are employed.

A polarizing microscope is used to measure retardation in the cross-sectional direction of the film after removal of the metal sheet from the laminate metal sheet, and a birefringence in the cross-sectional direction of the resin film is then obtained. Linear polarization light incident on the film is decomposed into two rays of linear polarization light in primary refractive index directions. At this time, oscillation of the light in the high refractive index direction is later than that of the light in the low refractive index direction. This causes a phase difference upon transmission through the film. The phase difference is referred to as a retardation R, and the relation thereof with a birefringence Δn is defined by expression (1).

$$\Delta n = R/d \quad (1)$$

Where, d: Film-layer thickness

The retardation measuring method will be described hereinbelow. Monochromatic light is transmitted through a polarizer to form linear polarization light, and the light is incident on a sample (film). As described above, since the incident light causes retardation, the light is formed to be elliptical polarization light by being passed through a Senarmont compensator. The light is then formed to be a linear polarization light having an angle θ with respect to the oscillation direction of a first linear polarization light. The angle θ is measured by rotating the polarizer. The relation between the retardation R and the angle θ is defined by expression (2) shown below.

$$R = \lambda \cdot \theta / 180 \quad (2)$$

Where, λ: Monochromatic light wavelength

Therefore, the birefringence Δn is defined by expression (3) driven by expressions (2) and (3).

$$\Delta n = (\lambda \cdot \theta / 180)/d \quad (3)$$

The thickness of the portion discussed above where the birefringence is 0.2 or lower is preferably restricted to a range lower than 5 μm. Reasons for the restriction are described hereunder.

Drawbacks take place in that the effect of the molecule mobility represented by the relaxation time T1ρ according to Embodiment 1 is reduced when the film is completely melted, and crystallization easily takes place in subsequent processing and heat treatment, thereby deteriorating processability of the film. As described above, the molten wetting of the film is indispensable to secure the film adhesion property. Thus, the thickness of the portion where the film is melted, that is, where the birefringence is 0.2 or lower is restricted to be smaller than 5 μm. This enables the adhesion property of the resin film (laminate layer), which is to be positioned on the inner surface side of the container after formation of the container, to be secured, and concurrently enables the processability and the impact resistance to be compatibly maintained at high levels.

In addition, the polyester preferably contains polyester containing a polyethylene terephthalate as a main component. More specifically, in view of the processability and the impact resistance, 90 mol % or more of repetition units are preferably, ethylene phthalate units. Further, a content of 95% or more is more preferable to enable even greater property improvement to be attained.

The structure of the resin film to be used in the Embodiment 1 may be either a single layer structure or a multilayer structure. However, in the case of a multilayered biaxially oriented polyester film constituted of at least two or more layers, the difference between intrinsic viscosities of layers of a non-laminate surface is preferably ranged from 0.01 to 0.5. This is preferable for the film to exhibit high lamination characteristics and impact resistance.

The film having the multilayer structure may include an adhesive layer having high adhesion property on the side to be adhered to the metal sheet. For example, the adhesive layer is preferably a layer of, for example, an isophthal-acid copolymer polyethylene terephthalate (PET/I), which has inter-solubility with polyethylene terephthalate contained in an upper layer of the adhesive layer. On the outer surface side of the container, in view of cost reduction and easiness in dye inclusion (described below), also an adhesive such as an epoxy phenol is preferably used for the adhesive layer.

In addition, in the case of the multilayer structure employed for the resin film that is to be positioned on the inner surface side of the container after formation of the container, a wax needs to be added to or an olefin resin needs to be blended with at least an uppermost layer of the film, that is, a layer positioned in contact with the content substance (outer surface side ① of the resin film a in FIG. 1). In view of economy, it is preferable that the wax be added to or the olefin resin be blended only with the uppermost layer of the film.

In the case where a wax is added to or an olefin resin is blended only with the uppermost layer of the multilayer film, the amount of the wax to be added is preferably in a range of 0.10 to 2.0% by mass with respect to the resin film constituting the uppermost layer of the multilayer film, and more preferably in a range of 0.80 to 2.0% by mass. Thereby, content-substance releasability can be improved while implementing cost reduction. The amount of the olefin resin to be blended is preferably in a range of 5.0 to 20.0% by mass with respect to the resin film constituting the uppermost layer of the multilayer film, and mote preferably in a range of 10.0 to 20.0% by mass. Thereby, content-substance releasability can be improved while implementing cost reduction.

Regarding the thickness of the overall film, while the thickness is not specifically limited, it is preferably in a range of 5 to 60 μm, and more preferably in a range of 10 to 40 μm.

The base metal sheet can be obscured by adding color pigments to the film, and a variety of film-specific color tones can be imparted thereto. In addition, complete obscuration is not provided, a bright color can be imparted by using brilliancy of the base metal, thereby enabling excellent ornamental design characteristics to be obtained. In addition, unlike printing onto the film surface, since pigments are directly added to the inside of the film, the color tones are not deteriorated even in container fabrication steps, the good appearance can be maintained. Generally, although printing with coating is performed after container formation, the steps can be partially omitted by the use of the colored film. As such, relevant costs can be reduced, and organic solvent and carbon dioxide can be suppressed.

The pigment to be added is required to exhibit excellent ornamental design characteristics after container formation. From this view point, an inorganic pigment or aromatic diamine base organic pigment such as aluminium powder, mica powder, or titanium oxide may be used. In particular, an aromatic diamine base organic pigment is preferable as it has a high tinting strength and expandability and enables excellent ornamental design characteristics to be secured. A usable example aromatic diamine base organic pigment is, for example, isoindolinone one yellow, which can be used to make the color of container to be a gold color by matching it with the brilliancy of the base metal. The pigment is not an FDA-approved safety and hygiene substance, so addition to the film on the container outer surface side is limited.

As a pigment that may be added to the film on the inner surface side of the container, a benzimidazolone base organic pigment is preferable to enable the container to exhibit excellent ornamental design characteristics. This is because the pigment has high tinting strength and expandability, and is an FDA-approved safety and hygiene substance. Using the benzimidazolone base organic pigment enables the inner surface of the container to be made in a gold color.

In the case of the resin film having a multilayer structure with two or more layers, a pigment may be added to at least one layer. If the resin film includes an adhesive layer, the pigment may be added only to the adhesive layer. Costs for coloration can be minimized by adding the pigment only to the adhesive layer.

The addition amount of the pigment is not particularly limited. Generally, however, if the content is 30% or more by mass for the resin film, the obscuration is saturated, and it is economically disadvantageous. As such, the content is preferably maintained 30% or lower.

When the resin film is a multilayer film, an addition amount of the pigment is a ratio with respect to a resin film layer to which the pigment is added (or, with respect to an adhesive layer when the pigment is added to the adhesive layer).

Even when a dye is added to the film, ornamental design characteristics similar to the case where the pigment is added can be imparted to the film. To obtain a gold color having high ornamental design characteristics, the dye is preferably composed by mixing a 1:2 complex chromate and phthalocyanine at a weight ratio of 10:1. Similar to the pigment case, the addition amount is preferably 30% or lower. In view of costs, the dye is preferably used to replace the pigment. When a dye is added to a film that is to be positioned on the inner surface side of the container, the film to be positioned on the inner surface side of the container is preferably structured to be a multilayer film, and the dye is preferably added to a layer that is to be positioned on the side that is not to be in contact with the content substance. For example, a film to be positioned the inner surface side of the container is preferably structured to be a multilayer film having an adhesive layer, and the dye is preferably added to the adhesive layer.

Depending on the case, a container is required to have a gold-color appearance. In this case, an isoindolinone yellow may be used as a pigment to be added to a resin film that is to be positioned on the outer surface side of the container. Concurrently, benzimidazolone yellow may be used as a pigment, or dye composed by mixing a phthalocyanine and a complex chromate may be used as a dye. Thereby, a container having high gold-color ornamental design characteristics can be obtained.

While no particular limitations are placed for a manufacturing method for the film itself (including a multilayer film), an example method is described hereunder. After individual polyester resins are dried by necessity, a resin and/or individual resins are fed into a well-known molten-lamination extruder. Then, the resin is extruded from a slit-shaped die in a sheet-like shape. The sheet-like resin is then adhesively placed on the surface of a casting drum by using an electrostatic application technique or the like so as to be cooled and solidified. Thereby, an unoriented sheet is obtained.

The unoriented sheet is then stretched or oriented in the direction of the film length and the direction of the film width, whereby a biaxially oriented film is obtained. The orientation ratio may be arbitrarily set corresponding to, for example, the degree of orientation, strength, and elasticity of the objective film. In view of quality, however, the ratio is preferably set by using a tenter technique. Particularly, a sequential biaxial orientation technique and a sequential biaxial orientation technique are preferable. In the former technique, a material is oriented in the longitudinal direction and is then oriented in the width direction. In the synchronous biaxial orientation technique, a material is oriented synchronously in both the longitudinal and width direction.

Subsequently described hereinbelow is a method for manufacturing a laminate metal sheet in stages where the films are laminated over the metal sheet. Embodiment 1 employs a method in which the metal sheet is heated to a temperature exceeding the melting point of the film, and a compressively bonding rolls (which hereinbelow will be referred to as "laminate rolls") are used to render the resin film to be in contact with two surfaces of the metal sheet and to then be thermally fusion bonded thereonto.

Laminating conditions are not particularly limited as long as they are appropriate to enable film structure defined in Embodiment 1 to be obtained. For example, preferably, the temperature at laminating commencement time is set to 280° C. or higher, and the time in which the film is in contact at a temperature higher than the melting point thereof is set to a range of 1 to 20 msec as a history of temperatures applied to the film at the time of lamination. To achieve the laminating conditions, not only high-speed lamination, but also cooling during adhesion is necessary. While the pressure to be applied at the time of lamination is not particularly limited, it is preferably set to 9.8 to 294 N/cm$^2$ (1 to 30 kgf/cm$^2$) as a surface pressure. If the pressure value is excessively low, even at a temperature not lower than the melting point, since the time is short, securing sufficient adhesion property is difficult. In contrast, at an excessively high pressure, while no inconveniences take place in performance of the laminate metal sheet, the force exerted on the laminate roll is large. Accordingly, since high strengths are required for relevant facilities, larger facilities are required. This is uneconomical.

For the metal sheet, an aluminum sheet, low carbon steel sheet, or the like that is widely used as a can material may be used. Particularly, for example, a surface-treated steel sheet (one of so-called "TFS" sheets) formed of two layer films made, wherein the lower layer is formed of a metalchrome and the upper layer is formed of a chromium hydroxide substance material, is most suitable.

Deposition amounts of the metalchrome layer and chromium hydroxide substance layer of the TFS are not particularly limited. However, in view of postprocessing adhesion property and anticorrosion resistance, the deposition amounts in Cr conversion quantity are preferably in a range of 70 to 200 mg/m$^2$ for metalchrome layer and in a range of 10 to 30 mg/m$^2$.

EXAMPLE

A chromium plated steel (TFS) sheet was manufactured using a steel sheet that has a thickness of 0.18 mm and a width of 977 mm and that was cold-rolled, annealed, and then temper-rolled. The steel sheet was then subjected to degreasing, acid-cleaning, and chromium plating. The chromium plating was conducted in a chromium plating bath containing $CrO^3$, $F^-$, and $SO_4^{2-}$, was subjected to intermediate rinsing, and was then subjected to electrolysis using a chemical treatment liquid containing $CrO_3$ and $F^-$. At this event, electrolysis conditions (such as the electric density and electricity quantity) were adjusted to thereby adjust the metalchrome deposition amount and the chromium-hydroxide-substance deposition amount to 120 mg/m$^2$ and 15 mg/m$^2$, respectively, in Cr conversion quantity.

Figure 2:
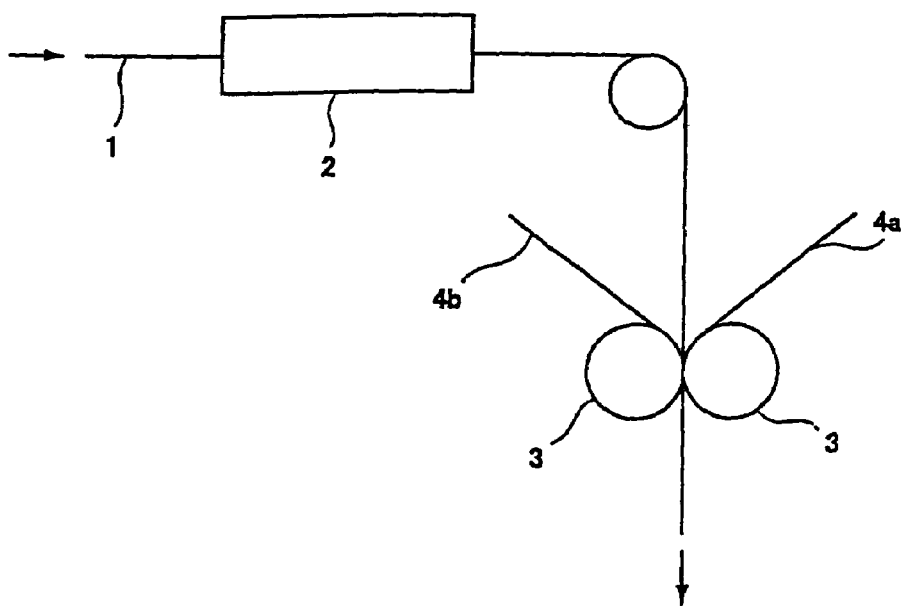
FIG. 2 is a view depicting essential portions of a laminating apparatus used in the embodiment.

Subsequently, laminate metal strips were manufactured by using a laminating apparatus shown in FIG. 2. A chromium plated steel sheet 1 of the type obtained as described above was heated using a metal-strip heating apparatus 2. Laminate rolls 3 were used to laminate individual resin films 4a and 4b, as shown in Tables 1 and 2, on surfaces of the chromium plated steel sheet 1. Specifically, on one of the surfaces of the chromium plated steel strip 1, the resin film 4a was laminated as a resin film to be positioned on the inner surface side of the container after formation of the container. On the other surface, the resin film 4b was laminated (thermally fusion-bonded) as a resin film to be positioned on the outer surface side of the container after formation of the container.

The laminate roll 3 is of an internal water cooled type, whereby cooling water was forcedly circulated during lamination to perform cooling during bonding of the film. When laminating the resin film over the metal sheet, the time in which the temperature of a film of an interface in contact with the metal sheet becomes equal to or higher than a melting point of the film was limited to a range of between 1 and 20 msec.

Characteristics of the used films were measured and evaluated in manners described in (1) and (2) below. In addition, characteristics of the laminate metal plate manufactured in the manner described above were measured and evaluated in manners described in (3) to (9) below.

(1) Relaxation Time T1ρ

Measuring apparatuses used for measuring solid NMR are a spectrometer JNM-GX270 supplied by Nihon Denshi, a solid amplifier supplied by Nihon Denshi, a MAS controller NM-GSH27MU supplied by Nihon Denshi, and a probe NM-GSH27T supplied by Nihon Denshi. Measurements were each performed to obtain T1ρ (vertical relaxation in a rotating frame) of $^{13}C$ nucleus. In the measurements, under a temperature of 24.5° C., a humidity of 50% RH, and a static magnetic field intensity of 6.34 T (Tesla), resonant frequencies of $^1H$ and $^{13}C$ were 270.2 MHz and 67.9 MHz, respectively. A MAS (magic, angle rotation) technique was employed to eliminate the influence of anisotropy in chemical shift. The number of rotations was in a range of 3.5 to 3.7 kHz. Conditions of the pulse sequence were set to 90° for $^1H$, a pulsewidth of 4 μsec, and a locking magnetic field strength of 62.5 kHz. A contact time of CP (crosspolarization) for shifting the polarization of $^1H$ was 1.5 msec. Holding times τ were set to 0.001, 0.5, 0.7, 1, 3, 7, 10, 20, 30, 40, and 50 msec. A free induction decay (FID) of a $^{13}C$ magnetization vector after each of the holding times τ (During the FID measurement, high power coupling was performed to eliminate the influence of dipole interaction caused by $^1H$. To enhance S/N, 512 integrations were executed). The pulse repletion time was set to a range of between 5 to 15 sec.

Ordinarily, a T1ρ value can be expressed as an expression shown below. Specifically, a peak intensity observed with respect to each holding time is semilogarithmically plotted, and the T1ρ value can be obtained from a skew in the plotting.

$$I(t)=\Sigma(Ai)\exp(-t/T1\rho i)$$

Where, Ai: Ratio of component with respect to T1ρi

In the present case, the analysis was performed in a two-component system (T1ρ1: amorphous component; and T1ρ2: crystal component), and the value was obtained through least-squares-method fitting by using the following expression:

$$I(t)=fa1\cdot\exp(-t/T1\rho1)+fa2\cdot\exp(-t/T1\rho2)$$

Where,
fa1: Ratio of component with respect to T1ρ1
fa2: Ratio of component with respect to T1ρ2
fa1+fa2=1

In the present case, T1ρ1 is used for T1ρ.

(2) Melting Point of Polyester

The polyester was crystallized, and the melting point thereof was measured using a differential scanning calorimeter (model DSC-2 supplied by PerkinElmer, Inc.) at a temperature rise rate of 10° C./min.

(3) Birefringence of Polyester Film

According to the method described in the embodiment, using a polarizing microscope, a measurement was performed to obtain the retardation in the cross-sectional direction of the resin film on the outer surface side of the container after removal of the metal sheet of the laminate metal plate. Based on the result, the birefringence in the cross-sectional direction of the film was measured.

(4) Polarity Force Component $\gamma s^h$ of Surface Free Energy

Factors when liquid was poured dropwise onto the laminate metal plate are defined such that the contact angle is represented by θ, the dispersion force component is represented by $\gamma s^d$, the polarity force component is represented by $\gamma s^h$, the surface free energy of the surface of the liquid is represented by γl, the dispersion force component thereof is represented by $\gamma l^d$, and the polarity force component thereof is represented by $\gamma l^h$. These factors satisfy the following relation:

$$\gamma l(1+\cos\theta)/2*(\gamma l^h)^{1/2}=(\gamma s^d)^{1/2}*(\gamma l^d)^{1/2}/(\gamma l^d)^{1/2}*(\gamma s^h)^{1/2}$$

Then, five liquids (pure water, glycerol, formamide, ethylene glycol, and dimethyl glycol) are poured dropwise onto the measurement object to measure the contact angle θ for each of the liquids (humidity: 55 to 65%; and temperature: 20° C.).

Each value of the contact angles θ and the components γl, $\gamma l^h$, and $\gamma l^d$ measured for the five liquids, and $\gamma s^h$ is obtained through least-squares-method fitting. Thus obtained $\gamma s^h$ is the polarity force component $\gamma s^h$ of the surface free energy of the surface of the laminate metal plate.

(5) Content-Substance Releasability

At a drawing step, by using a drawing and forming machine, the laminate metal plate was formed into cups under conditions in which a blank diameter is set to 100 mm and a draw ratio (preformation diameter/postformation diameter) is set to 1.88. Subsequently, a content substance made by uniformly mixing eggs, meat, and oatmeal was filled into each of the formed cups, a lid was spin-pressed down onto the cup, and a retorting process (130° C.×90 minutes) was conducted. Thereafter, the lid was taken off, the cup was turned upside down, the content substance was released, and the level of the content substance remaining in the cup was observed. The cup was then shaken a couple of times with hand, and the content substance was retrieved. Then, the condition including the amount of remaining part of the content substance in the cup's internal side was observed. In this manner, the degree of the content-substance releasability was evaluated.

(Evaluations)

⊚: Condition in which the content substance can be released just by turning the can upside down (without shaking the can with hand) without remaining sticking part of the content substance in the cup after releasing.

○: Condition in which sticking part still remains in the cup just after the cup is turned upside down, but the cup is emptied after the cup is shaken a couple of times with hand.

x: Condition in which it is difficult to release the content substance even by shaking the cup a couple of times with hand.

(6) Formability

After wax application over the laminate metal plate, circular sheets each having a diameter of 179 mm were punched out, and shallow-drawn cans were thereby obtained at a draw ratio of 1.80. Subsequently, redrawing processes were performed for the individual cups at a draw ratio of 2.20 and a draw ratio of 2.90. Then, doming is performed therefor according to a known technique, trimming is performed, and neckin-flanging processing is then performed. Thereby, deep-drawn cans were obtained.

(Evaluations)

⊚: A condition in which no damage nor film-whitening is recognized in the postformation film.

○: A condition in which the cup is formable, but film-whitening is recognized.

x: A condition in which the cup is broken to an extent that the can is not formable.

(7) Adhesion Property

For cans having been formable in (6), peel-testing samples (width 15 mm×length 120 mm) were each cut out from a can body portion. A portion of the film was peeled off from a long-side end portion of the cut-off sample, and the film in the peeled off portion was opened in the direction opposite to the chromium plated steel sheet (angle: 180°) wherefrom the film was peeled off. Then, using a tensile tester, peel testing was conducted for the peeled-off film at a tensile speed of 30 mm/min, and the adhesion per width of 15 mm was evaluated. The adhesion-measurement object surface was selected from the inner surface side of the can.

(Evaluations)

⊚: 1.47 N/15 mm or higher (0.15 kgf/15 mm or higher)

○: 0.98 N/15 mm or higher, and lower than 1.47 N/15 mm (0.10 kgf/15 mm or higher, and lower than 0.15 kgf/15 mm)

x: Lower than 0.98 N/15 mm (lower than 0.10 kgf/15 mm)

(8) Impact Resistance

For cans having been formable in (6), the cans were each filled with water, 10 cans each per testing were dropped onto a vinyl-chloride tiled floor from a portion of a height of 1.25 m. Thereafter, a voltage of 6 V was applied to electrodes and the metal cans, current values were read out after three seconds, and average values were obtained in units of tested 10 cans.

(Evaluations)
⊚: Lower than 0.01 mA
○: 0.01 mA or higher, lower than 0.01 mA
x: 0.1 mA or higher (9) Ornamental Design Characteristics Cans having been formable in (6) were visually observed for inside and outside surfaces thereof, and were thereby observed whether sufficient ornamental design characteristics were obtained.

(Evaluations)
⊚: A condition in which a uniform color tone is obtained, the color tone of the base metal sheet is completely concealed, and the can is beautifully finished.
○: A condition in which a substantially uniform color tone is obtained, and the color tone of the base metal sheet is substantially concealed, hence not requiring repair coating.
x: A condition in which the color tone is not uniform, and a unconcealed portion(s) is present, hence requiring repair coating to secure sufficient ornamental design characteristics.

Tables 1 to 3 show the results of the measurements and evaluations with respect to contents of the laminated resin film and the metal sheet. As shown in Tables 1 to 3, inventive examples within the scope of the Embodiment 1 are excellent not only in the content-substance releasability and the formability but also in the adhesion property and the ornamental design characteristics. Among the inventive examples, those with $2.0 \times 10^{-3}$ N/m or lower in the polarity porce component $\gamma s^h$ of the surface free energy have particularly higher content-substance releasability. In comparison, comparative examples out of the scope of the invention were found to be deficient in one of the content-substance releasability or formability.

In Table 1, notes 1) to 7) indicate as follows:
1) PET: Polyethylene terephthalate (biaxially oriented film);
2) PP: Polypropylene;
3) Isophthalic acid-copolymerized polyethylene terephthalate (copolymerization ratio: 12 mol %)
4) Modified PP: Anhydrous maleic acid modified polypropylene
5) Stearyl stearate: Ester stearate (C18-C18)
6) The mica powder was used in such a manner that it was heated and cured after uniformly coating of a colorant and a resin adhesive on the surface thereof was used. Aluminium powder used is scale-state aluminum powder.
7) For the multilayer film, the addition amount is indicated by the ratio with respect to the upper layer.

Notes 1), 3), and 6) are identical to those of Table 2.

TABLE 1

| | | Surface to be positioned on inner surface side after container formation | | | | |
|---|---|---|---|---|---|---|
| No. | Film type | $\gamma s^h$ ($10^{-3}$ N/m) | Film thickness (μm) | Film melting point (° C.) | Adhesive layer | T1ñ (msec) |
| Inventive example 1 | PET[1] | 4.0 | 15 | 255 | None | 220 |
| Inventive example 2 | PET | 2.5 | 15 | 255 | None | 220 |
| Inventive example 3 | PET | 1.5 | 15 | 255 | None | 220 |
| Inventive example 4 | PET | 1.8 | 15 | 255 | None | 220 |
| Inventive example 5 | PET | 1.5 | 15 | 255 | None | 400 |
| Inventive example 6 | PET | 1.5 | 15 | 255 | None | 120 |
| Inventive example 7 | Two-layer PET | 1.8 | Adhesive layer/ Upper layer 2/13 | 255 | PET/I (12)[3] | 220 |
| Inventive example 8 | PET | 3.5 | 15 | 255 | None | 220 |
| Inventive example 9 | PET | 1.5 | 15 | 255 | None | 220 |
| Inventive example 10 | PET | 1.5 | 15 | 255 | None | 220 |
| Inventive example 11 | Two-layer PET | 1.5 | Adhesive layer/ Upper layer 2/13 | 255 | PET/I (12) | 220 |
| Inventive example 12 | Three-layer PET | 1.5 | Adhesive layer/ Intermediate layer/ Upper layer 2/11/2 | 255 | PET/I (12) | 220 |
| Inventive example 13 | Two-layer PET | 1.2 | Lower layer/Upper layer 11/2 | 255 | None | 220 |
| Inventive example 14 | PET | 1.5 | 15 | 255 | None | 220 |
| Inventive example 15 | PET | 1.5 | 15 | 255 | None | 220 |
| Inventive example 16 | PET | 1.5 | 15 | 255 | None | 220 |
| Comparative example 1 | PET | 7.0 | 15 | 255 | None | 220 |
| Comparative example 2 | PET | 6.0 | 15 | 255 | None | 220 |
| Comparative | Two-layer | 0.3 | Adhesive layer/ | 160 | Modified | — |

TABLE 1-continued

| example 3 | PP[7] | Upper layer 5/15 | PP[4] |

| | Surface to be positioned on inner surface side after container formation | | | | |
| | Wax or olefin | | Added pigment/dye | | |
| No. | Type | Addition amount[7] (mass %) | Type | Component-added film layer | Addition amount (mass %) |
|---|---|---|---|---|---|
| Inventive example 1 | Carnauba | 0.50 | Benzimidazolone yellow | Base layer | 10 |
| Inventive example 2 | Carnauba | 0.70 | Benzimidazolone yellow | Base layer | 10 |
| Inventive example 3 | Carnauba | 0.80 | Benzimidazolone yellow | Base layer | 10 |
| Inventive example 4 | Stearyl stearate[2] | 1.00 | Benzimidazolone yellow | Base layer | 10 |
| Inventive example 5 | Carnauba | 0.80 | Benzimidazolone yellow | Base layer | 10 |
| Inventive example 6 | Carnauba | 0.80 | Benzimidazolone yellow | Base layer | 10 |
| Inventive example 7 | Polyethylene | 12.0 | Benzimidazolone yellow | Adhesive layer | 15 |
| Inventive example 8 | Polyethylene | 8.0 | Benzimidazolone yellow | Base layer | 10 |
| Inventive example 9 | Carnauba | 0.80 | Benzimidazolone yellow | Base layer | 10 |
| Inventive example 10 | Carnauba | 0.80 | Benzimidazolone yellow | Base layer | 10 |
| Inventive example 11 | Carnauba | 0.80 | Benzimidazolone yellow | Adhesive layer | 15 |
| Inventive example 12 | Carnauba (Upper layer) | 0.80 | Benzimidazolone yellow | Adhesive layer | 15 |
| Inventive example 13 | Carnauba (Upper layer) | 1.00 | Benzimidazolone yellow | Adhesive layer | 15 |
| Inventive example 14 | Carnauba | 0.80 | titania | Base layer | 20 |
| Inventive example 15 | Carnauba | 0.80 | Mica powder + Aluminum powder[4] | Base layer | 15 |
| Inventive example 16 | Carnauba | 0.80 | Benzimidazolone yellow | Adhesive layer | 10 |
| Comparative example 1 | — | — | Benzimidazolone yellow | Base layer | 10 |
| Comparative example 2 | Carnauba | 0.05 | Benzimidazolone yellow | Base layer | 10 |
| Comparative example 3 | — | — | Benzimidazolone yellow | Adhesive layer | 10 |

TABLE 2

| | Surface to be positioned on inner surface side after container formation | | | | | | | |
| | Film | | | | | Wax or olefin | | |
| No. | Film type | Film thickness (μm) | Film melting point (°C.) | Adhesive layer | T1ñ (msec) | Type | Component-added film layer | Addition amount[7] (mass %) |
|---|---|---|---|---|---|---|---|---|
| Inventive example 1 | PET[1] | 0.8 (Adhesive layer)/15 | 255 | Epoxy phenol | 220 | 1:2 complex chromate + phthalocyanine | Adhesive layer | 5 |
| Inventive example 2 | PET | 0.8 (Adhesive layer)/15 | 255 | Epoxy phenol | 220 | 1:2 complex chromate + phthalocyanine | Adhesive layer | 5 |
| Inventive example 3 | PET | 0.8 (Adhesive layer)/15 | 255 | Epoxy phenol | 220 | 1:2 complex chromate + phthalocyanine | Adhesive layer | 5 |
| Inventive example 4 | PET | 0.8 (Adhesive layer)/15 | 255 | Epoxy phenol | 220 | 1:2 complex chromate + phthalocyanine | Adhesive layer | 5 |
| Inventive example 5 | PET | 0.8 (Adhesive layer)/15 | 255 | Epoxy phenol | 400 | 1:2 complex chromate + phthalocyanine | Adhesive layer | 5 |
| Inventive example 6 | PET | 0.8 (Adhesive layer)/15 | 255 | Epoxy phenol | 120 | 1:2 complex chromate + phthalocyanine | Adhesive layer | 5 |
| Inventive example 7 | PET | 0.8 (Adhesive layer)/15 | 255 | Epoxy phenol | 220 | 1:2 complex chromate + phthalocyanine | Adhesive layer | 5 |
| Inventive example 8 | PET | 0.8 (Adhesive layer)/15 | 255 | Epoxy phenol | 220 | 1:2 complex chromate + phthalocyanine | Adhesive layer | 5 |

TABLE 2-continued

| No. | | | | | | | | |
|---|---|---|---|---|---|---|---|---|
| Inventive example 9 | PET | 0.8 (Adhesive layer)/15 | 255 | Epoxy phenol | 220 | 1:2 complex chromate + phthalocyanine | Adhesive layer | 5 |
| Inventive example 10 | PET | 0.8 (Adhesive layer)/15 | 255 | Epoxy phenol | 220 | 1:2 complex chromate + phthalocyanine | Adhesive layer | 5 |
| Inventive example 11 | Two-layer | 2.0 (Adhesive layer)/13 | 255 | PET/I(12)[2)] | 220 | Benzimidazolone yellow | Adhesive layer | 10 |
| Inventive example 12 | PET | 0.8 (Adhesive layer)/15 | 255 | Epoxy phenol | 220 | 1:2 complex chromate + phthalocyanine | Adhesive layer | 5 |
| Inventive example 13 | PET | 0.8 (Adhesive layer)/15 | 255 | Epoxy phenol | 220 | 1:2 complex chromate + phthalocyanine | Adhesive layer | 5 |
| Inventive example 14 | PET | 0.8 (Adhesive layer)/15 | 255 | Epoxy phenol | 220 | 1:2 complex chromate + phthalocyanine | Adhesive layer | 5 |
| Inventive example 15 | Two-layer PET | 0.8 (Adhesive layer)/15 | 255 | PET/I(12) | 220 | Mica powder + Aluminum powder[1)] | Adhesive layer | 5 |
| Inventive example 16 | Two-layer PET | 2.0 (Adhesive layer)/13 | 255 | PET/I(12) | 220 | Isoindorinon yellow | Adhesive layer | 10 |
| Comparative example 1 | PET | 0.8 (Adhesive layer)/15 | 255 | Epoxy phenol | 220 | 1:2 complex chromate + phthalocyanine | Adhesive layer | 5 |
| Comparative example 2 | PET | 0.8 (Adhesive layer)/15 | 255 | Epoxy phenol | 220 | 1:2 complex chromate + phthalocyanine | Adhesive layer | 5 |
| Comparative example 3 | PET | 0.8 (Adhesive layer)/15 | 255 | Epoxy phenol | 100 | 1:2 complex chromate + phthalocyanine | Adhesive layer | 5 |

| No. | Lamination start temp. (° C.) | Melting-point exceeding time | Layer thickness of post-lamination film region where birefringence is 0.02 or lower (μm) |
|---|---|---|---|
| Inventive example 1 | 282 | 15 | 2 |
| Inventive example 2 | 282 | 15 | 2 |
| Inventive example 3 | 282 | 15 | 2 |
| Inventive example 4 | 282 | 15 | 2 |
| Inventive example 5 | 282 | 15 | 2 |
| Inventive example 6 | 282 | 15 | 2 |
| Inventive example 7 | 282 | 15 | 4 |
| Inventive example 8 | 282 | 15 | 2 |
| Inventive example 9 | 293 | 23 | 4 |
| Inventive example 10 | 300 | 30 | 8 |
| Inventive example 11 | 277 | 12 | 3 |
| Inventive example 12 | 282 | 15 | 4 |
| Inventive example 13 | 282 | 15 | 2 |
| Inventive example 14 | 282 | 15 | 2 |
| Inventive example 15 | 277 | 12 | 2 |
| Inventive example 16 | 277 | 12 | 2 |
| Comparative example 1 | 282 | 15 | 2 |
| Comparative example 2 | 282 | 15 | 2 |
| Comparative example 3 | 190 | 17 | — |

TABLE 3

| No. | Content-substance releasability | Formability | Adhesion property | Impact resistance | Ornamental design characteristics Inner surface | Ornamental design characteristics Outer surface |
|---|---|---|---|---|---|---|
| Inventive example 1 | ○ | ◎ | ◎ | ◎ | ◎ | ◎ |
| Inventive example 2 | ○ | ◎ | ◎ | ◎ | ◎ | ◎ |
| Inventive example 3 | ◎ | ◎ | ◎ | ◎ | ◎ | ◎ |
| Inventive example 4 | ◎ | ◎ | ◎ | ◎ | ◎ | ◎ |
| Inventive example 5 | ◎ | ◎ | ◎ | ◎ | ◎ | ◎ |
| Inventive example 6 | ◎ | ○ | ○ | ○ | ◎ | ◎ |
| Inventive example 7 | ◎ | ◎ | ◎ | ◎ | ◎ | ◎ |
| Inventive example 8 | ○ | ◎ | ◎ | ◎ | ◎ | ◎ |
| Inventive example 9 | ◎ | ◎ | ◎ | ◎ | ◎ | ◎ |
| Inventive example 10 | ◎ | ○ | ◎ | ◎ | ◎ | ◎ |
| Inventive example 11 | ◎ | ◎ | ◎ | ◎ | ◎ | ◎ |
| Inventive example 12 | ◎ | ◎ | ◎ | ◎ | ◎ | ◎ |
| Inventive example 13 | ◎ | ◎ | ◎ | ◎ | ◎ | ◎ |
| Inventive example 14 | ◎ | ◎ | ◎ | ◎ | ◎ | ◎ |
| Inventive example 15 | ◎ | ◎ | ◎ | ◎ | ○ | ○ |
| Inventive example 16 | ◎ | ◎ | ◎ | ◎ | ◎ | ◎ |
| Comparative example 1 | X | ◎ | ◎ | ◎ | ◎ | ◎ |
| Comparative example 2 | X | ◎ | ◎ | ◎ | ◎ | ◎ |
| Comparative example 3 | ◎ | X | — | — | — | — |

Embodiment 2

The inventors discovered that a film laminate metal plate excellent in formability, postprocessing adhesion property, content-substance releasability, flavor-retaining characteristics, and quality stability can be obtained by adding a wax component to a biaxially oriented polyester film formed of polyester in which 93 mol % or more of structure units are ethylene terephthalate units, and a crystal size χ in a (100) plane obtained through X-ray diffraction measurement is 6.0 nm or smaller. More specifically, essentials of Embodiment 2 are described hereunder.

(1) A film-laminated metal sheet for container including a resin film A and a resin film B, the resin film A being a biaxially oriented polyester film formed of polyester in which 93 mol % or more of structure units are ethylene terephthalate units and a crystal size χ in a (100) plane obtained through X-ray diffraction measurement is 6.0 nm or smaller, and the resin film B being a biaxially oriented polyester film and containing 0.1 to 2.0% in a ratio by mass of a wax component, the film-laminated metal sheet for container being characterized in that the resin film B is laminated over a surface of the metal sheet that is to be positioned on the inner surface side of the container after formation of the container, and the resin film A is laminated over a surface of the metal sheet that is to be positioned on the outer surface side of the container after formation of the container.

(2) A film-laminated metal sheet for container according to (1), characterized by containing carnauba wax or ester stearate as the wax component.

(3) A film-laminated metal sheet for container according to (1) or (2), characterized in that a region where the birefringence of each of the resin film A and the resin film B after lamination is 0.02 or lower is smaller than 5 μm from a contact interface with the metal sheet in the thickness direction.

(4) A film-laminated metal sheet for container according to any one of (1) to (3), characterized in that 96 mol % or more of the structure units of the polyester are ethylene terephthalate units.

(5) A film-laminated metal sheet for container according to any one of (1) to (4), characterized in that an in-plane orientation coefficients of the resin film A and the resin film B are each 0.150 or less.

(6) A film-laminated metal sheet for container according to any one of (1) to (5) characterized in that melting points of the resin film A and the resin film B are each in a range of between 246° C. or higher and 280° C. or lower.

(7) A film-laminated metal sheet for container according to any one of (1) to (6), characterized in that the resin film B is constituted of at least two or more layers and the resin film B is formed such that only an uppermost layer to be in contact with the content substance contains 0.1 to 2.0% in a ratio by mass of the wax component with respect to the resin.

The Embodiment 2 will be described hereinbelow in detail.

In the Embodiment 2, a polyester film is used for the films (the resin film A and the resin film B), and 93 mol % or more of the structure units of the polyester are ethylene terephthalate units. The ethylene terephthalate units need to be 93 mol % or more in content to obtain excellent flavor-retaining characteristics after a heat treatment such as a retorting process. To maintain the flavor-retaining characteristics excellent even in long time storage of beverage in the metal can, the content is preferably 96 mol % or more, and more preferably 9.8 mol % or more. In the Embodiment 2, the "excellent flavor-retaining characteristics" refers to a level at which the flavor of the content substance is not deteriorated by, for example, adsorption of an aromatic component of the content substance of the can to the film and/or by an eluted substance from the film.

Other components, such as a dicarboxylic acid component and glycol component, may be copolymerized in a range that does not reduce the flavor-retaining characteristics. Illustrative examples of the dicarboxylic acid include aromatic dicarboxylic acids such as diphenyl carboxylic acid, 5-sodium sulfoisophthalate, and phthalic acid; and aliphatic dicarboxylic acids such as oxalic acid, succinic acid, adipic acid, sebacic acid, dimer acid, maleic acid, and fumaric acid; aliphatic dicarboxylic acid such as cyclohexanedicarboxylic acid; and oxycarboxlic acid such as p-oxybenzoic acid.

Illustrative examples of the glycol component include aliphatic glycols, such as ethylene glycol, propanediol, butanediol, pentanediol, hexanediol, and neopentyl glycol; alicyclic glycols such as cyclohexane dimethanol; aromatic glycols such as bisphenol A and bisphenol S; diethylene glycol; and polyethylene glycol. Two or more of these dicarboxylic acid components and glycol components may be used in combination.

As long as effects of Embodiment 2 are not interfered, multifunctional compounds, such as trimellitic acid, trimesic acid, trimethylol propane, may be copolymerized.

Examples of components slightly contained in the polyester used in the Embodiment 2 include, diethylene glycol, polyethylene glycol, cyclohexane dimethanol, sebacic acid, and dimer acid.

Embodiment 2 permits two or more polymers to be blended for use. For the film to be used in Embodiment 2, isophthalic acid may be copolymerized in a range that does not significantly reduce the characteristics. However, the film is preferably formed of polyester not containing isophthalic acid to prevent time-dependent deterioration in impact resistance and flavor-retaining characteristics.

For the film to be used in Embodiment 2, the polyester, in which 93 mol % or more of the structure units are ethylene terephthalate units, needs to be biaxially oriented. The technique for biaxial orientation may be either a synchronous biaxial orientation technique or a sequential biaxial orientation technique. The biaxially oriented film offers advantages in laminatability. Specifically, even when slight temperature variations have taken place during lamination, post-lamination variations in formability and impact resistance can be reduced. Consequently, relatively higher steady and excellent formability and impact resistance can be secured. From this viewpoint, the crystal size $\chi$ in the (100) plane, which can be obtained through the X-ray diffraction measurement, needs to be 6.0 nm or smaller, and preferably 4.5 nm smaller. Even with 4.5 nm, however, the crystal size $\chi$ is preferably smaller. In this regard, the inventors verified that crystal sizes $\chi$ of presently available films are 3.5 nm or greater, and the inventors confirmed that laminatabilities of films up to the aforementioned crystal size are excellent. When the crystal size $\chi$ in the (100) plane exceeds 6.0 nm, the laminatability is insufficient, and variations in the formability and the impact resistance are increased. The crystal size $\chi$ in the (100) plane is obtained using a Scherrer equation through reflection X-ray diffraction measurement.

The (100) plane crystal size smaller than 6.0 nm is determined depending on, for example, the polymer constituting the film, addition substance, orientation conditions, and heat treatment conditions. The crystal size can be achieved by setting of these conditions to appropriate conditions. For example, while the heat treatment temperature and time may be reduced, the values need to be within ranges that satisfy the characteristics required for the film.

To further improve the laminatability and the flavor-retaining characteristics, the film to be used in Embodiment 2 preferably has an intrinsic viscosity of the polyester of 0.60 dl/g or higher, and more preferably 0.63 dl/g or higher. An intrinsic viscosity lower than 0.50 dl/g is not preferable since, for example, the lower viscosity causes oligomer to be eluted, thereby leading to deterioration in the flavor-retaining characteristics.

In Embodiment 2, the resin film (resin film B) to be positioned on the inner surface side of the container after formation of the container is defined to be the polyester film that contains 0.1 to 2.0% in a ratio by mass of a wax component with respect to the resin. The wax component is added as an addition substance ① to reduce the surface energy of the film and ② to impart lubricity to the surface. The effect of ① makes it difficult for the content substance to adhere to the film, and the effect of ② decreases a friction coefficient of the film surface. These effects enable the content-substance releasability to be significantly enhanced.

Reasons for restricting the content of the wax component to 0.1% or higher are that, at a ratio lower than 0.1%, the effects of ① and ② are reduced, and the content-substance releasability is therefore deteriorated. On the other hand, the content is limited to 2.0% or lower for the reason that a content exceeding 2.0% causes the content-substance releasability to be substantially saturated and disables a significant effect to be obtained. In addition, the exceeding ratio falls in a range that causes difficulty in film deposition technique, consequently leading to low productivity and high costs.

For the wax component, an organic or inorganic lubricant material is usable. Particularly, an organic lubricant material such as an aliphatic-acid ester is preferable. A more preferable component is a vegetable-type, natural-type wax, specifically a carnauba wax (a main component thereof is $CH_3(CH_2)_{24}COO(CH_2)_{29}CH_3$, and the wax contains various other components composed of aliphatic groups and alcohol), or ester stearate. Either of these components is preferable as it exhibits significant effects ① and ②, and has a molecular structure allowing easy inclusion into the film. The polyester film containing the wax can be manufactured by an ordinary deposition technique after the wax is blended with the polyester.

The effects described above cannot be obtained in such a way that a wax component is coated over a film surface. This is because canned foods and the like are subjected to retort processing for infection after the content substance is packaged, and a precoated wax is absorbed into the content substance during the retort processing. However; as in the invention, in the case where the wax is added to the film, the wax slowly appears over the surface with its density increasing. Consequently, the wax is not absorbed overall into the content substance, therefore enabling the above-described effects to be securely exhibited.

The structure of the film after being laminated over the metal sheet is preferably such that a region where the birefringence thereof is 0.02 or lower is preferably smaller than 5 μm from a contact interface with the metal sheet in the thickness direction. According to an ordinary manufacturing method of a laminate metal sheet, the metal sheet is bonded with a film such that the film is placed in contact with the heated metal sheet, is then compressed thereonto to cause a film resin on a metal sheet interface to melt, and is then wetted on the metal sheet. As such, the film needs to be in a melted state to secure the adhesion property between the film and the metal sheet. Accordingly, the film birefringence of a portion in contact with the metal sheet after lamination is naturally reduced. As defined in Embodiment 2, if the film birefringence of the contact is 0.02 or lower, the state indicates that the molten-film wet at the time of lamination has been sufficient. Thereby, high adhesion property can be secured. The birefringence is measured in the same manner as that in Embodiment 1.

The thickness of the region where the birefringence thereof is 0.02 or lower is preferably smaller than 5 μm from the contact interface with the metal sheet. Reasons therefor are described hereunder.

The film of Embodiment 2 has high processability through control of the (100) plane crystal size. However, when the film is completely melted, the crystal structure thereof collapses, and crystallization easily occurs in subsequent processing and heat treatment. This leads to deterioration in the processability. Molten wetting of the film is indispensably required to secure the film adhesion property, as described above. In this regard, the inventors conducted extensive researches and studies. As a result, the thickness of the portion where the film is melted, that is, where the birefringence is 0.2 or lower was restricted to be smaller than 5 μm. This enables the adhesion property to be secured, and concurrently enables the processability and the impact resistance to be compatibly maintained at high levels.

The film to be used in the Embodiment 2 preferably has an in-plane orientation coefficient of 0.150 or less to enhance laminatability of the metal sheet and subsequent formability and impact resistance thereof. To further enhance the laminatability, the coefficient is preferably 0.145 or less, and more preferably 0.140. An excessively high in-plane orientation coefficient causes deteriorations not only in the laminatability but also the formability. This leads to deterioration in the flavor-retaining characteristics after the can formation.

The melting point of the polyester used in Embodiment 2 is preferably between 246° C. or higher and 280° C. or lower, and more preferably between 250° C. or higher and 275° C. or lower. A melting point lower than of 246° C. can cause an undesirable case where the heat resistance is reduced. On the other hand, a melting point exceeding 280° C. can cause an undesirable case where the formability is deteriorated.

The structure of the resin film to be used in the Embodiment 2 may be either a single layer structure or a multilayer structure. However, in the case of a multilayer structure, a wax needs to be added to an uppermost layer of the film (resin film B) that is to be in contact with the content substance. In view of economy, the wax is preferably added only to the uppermost layer of the film.

The thickness of the overall film is preferably in a range of 3 to 50 μm, and more preferably in a range of 8 to 30 μm, to secure the formability after lamination of the film to the metal, the coverage with respect to the metal, the impact resistance, and the flavor-retaining characteristics.

While no particular limitations are placed for a manufacturing method for the film itself (including a multilayer film), an example method is described hereunder. After individual polyester resins are dried by necessity, a resin and/or individual resins are fed into a well-known molten-lamination extruder. Then, the resin is extruded from a slit-shaped die in a sheet-like shape. The sheet-like resin is then adhesively placed on the surface of a casting drum by using an electrostatic application technique or the like so as to be cooled and solidified. Thereby, an unoriented sheet is obtained.

The unoriented sheet is then stretched or oriented in the direction of the film length and the direction of the film width, whereby a biaxially oriented film is obtained. The orientation ratio may be arbitrarily set corresponding to, for example, the degree of orientation, strength, and elasticity of the objective film. In view of quality, however, the ratio is preferably set by using a tenter technique. Particularly, a sequential biaxial orientation technique and a sequential biaxial orientation technique are preferable. In the former technique, a material is oriented in the longitudinal direction and is then oriented in the width direction. In the synchronous biaxial orientation technique, a material is oriented synchronously in both the longitudinal and width direction.

Subsequently described hereinbelow is a method for manufacturing a laminate metal sheet in such a manner that the film is laminated over a metal sheet. The present case of the invention employs a method in which a metal sheet is heated to a temperature exceeding the melting point of the film, and a compressively bonding rolls (which hereinbelow will be referred to as "laminate rolls") are used to render the resin film to be in contact with two surfaces of the metal sheet and to then be thermally fusion bonded thereonto.

Laminating conditions are not particularly limited as long as they are appropriate to enable film structure defined in Embodiment 2 to be obtained. For example, preferable laminating conditions are such that temperature at laminating commencement time is set to 280° C. or higher, and the time in which the film is in contact at a temperature higher than the melting point thereof is set to a range of 1 to 20 msec as a history of temperatures applied to the film at the time of lamination. To achieve the laminating conditions, not only high-speed lamination, but also cooling during adhesion is necessary. While the pressure to be applied at the time of lamination is not particularly limited, it is preferably set to 1 to 30 kgf/cm$^2$ as a surface pressure. If the pressure value is excessively low, even at a temperature not lower than the melting point, since the time is short, it is difficult to secure sufficient adhesion property. In contrast, at an excessively high pressure, while no inconveniences take place in performance of the laminate metal sheet, the force exerted on the laminate roll is large. Accordingly, since high strengths are required for relevant facilities, larger facilities are required. This is uneconomical.

For the metal sheet, an aluminum sheet, low carbon steel sheet, or the like that is widely used as a can material may be used. Particularly, for example, a surface-treated steel sheet (one of so-called "TFS" sheets) formed of two layer films made, wherein the lower layer is formed of a metalchrome and the upper layer is formed of a chromium hydroxide substance material, is most suitable.

Deposition amounts of the metalchrome layer and chromium hydroxide substance layer of the TFS are not particularly limited. However, in view of postprocessing adhesion property and anticorrosion resistance, the deposition amounts in Cr conversion quantity are preferably in a range of 70 to 200 mg/m$^2$ for metalchrome layer and in a range of 10 to 30 mg/m$^2$.

EXAMPLE

A chromium plated steel sheet was manufactured using a steel sheet that has a thickness of 0.18 mm and a width of 977 mm and that was cold-rolled, annealed, and then temper-rolled. The steel sheet was then subjected to degreasing, acid-cleaning, and chromium plating. The chromium plating was conducted in a chromium plating bath containing $CrO^3$, $F^-$, and $SO_4^{2-}$, was subjected to intermediate rinsing, and was then subjected to electrolysis using a chemical treatment liquid containing $CrO_3$ and $F^-$. At this event, electrolysis conditions (such as the electric density and electricity quantity) were adjusted to thereby adjust the metalchrome deposition amount and the chromium-hydroxide-substance deposition amount.

Subsequently, laminate metal strips were manufactured by using a laminating apparatus shown in FIG. 2. A chromium plated steel sheet 1 of the type obtained as described above was heated using a metal-strip heating apparatus 2. Laminate rolls 3 were used to laminate individual resin films 4a and 4b, as shown in Table 4, on surfaces of the chromium plated steel sheet 1. Specifically, on one of the surfaces of the chromium plated steel strip 1, the resin film 4a was laminated as a resin film (resin film B) to be positioned on the inner surface side of the container after formation of the container. On the other surface, the resin film 4b was laminated (thermally fusion-bonded) as a resin film (resin film A) to be positioned on the outer surface side of the container after formation of the container. The resin film 4a, which is to be positioned on the outer surface side of the container after formation of the container, was manufactured using a material of the resin film 4b to which the wax is added. The contents of the laminated-resin films are shown in Table 1. The laminate roll 3 is of an internal water cooled type, whereby cooling water was forcedly circulated during lamination to perform cooling during bonding of the film.

Characteristics of the used biaxially oriented polyester films were measured and evaluated in manners described in (1) to (4) below. In addition characteristics of the laminate metal plate manufactured in the manner described above were measured and evaluated in manners described in (5) to (10) below. Films in (1) and (2) are prelamination material films. The characteristics of the films in (2) do not vary even after lamination.

(1) Crystal Size $\chi$

The crystal size $\chi$ in the (100) plane was obtained using a Scherrer equation through reflection X-ray diffraction measurement. The measurement X-ray wavelength was set to 0.15418 nm (CuK$\alpha$), and the (100) plane analysis was observed at a Bragg angle of 12.7°.

(2) Melting point of Polyester

The polyester was crystallized, and the melting point thereof was measured using a differential scanning calorimeter (model DSC-2 supplied by PerkinElmer, Inc.) at a temperature rise rate of 10° C./min.

(3) In-plane Orientation Coefficient

With a sodium D ray (wavelength: 589 nm) being used as a light source, refractive indexes (denoted by "Nx," "Ny," and "Nz") in the longitudinal direction, width direction, and thickness direction were measured using an Abbe refractometer. Then, an in-plane orientation coefficient fn was calculated and obtained using equation "fn=(Nx+Ny)/2−Nz". The measurement was performed to obtain each of arbitrary positions (10 positions) of the laminated metal sheet, and an average value of the results was used as the in-plane orientation coefficient.

(4) Birefringence of Polyester Film

The retardation in the cross-sectional direction of the film after the metal sheet of the laminate metal plate has been removed was measured using a polarizing microscope. According to the result, the birefringence in the cross-sectional direction of each of the films was obtained.

(5) Content-Substance Releasability

At a drawing step using a drawing and forming machine, the laminate metal plate was formed into cups under conditions in which a blank diameter is set to 100 mm and a draw ratio (preformation diameter/postformation diameter) is set to 1.88. Subsequently, content substance made by uniformly mixing eggs, meat, and oatmeal was filled into each of the formed cups, a lid was spin-pressed down onto the cup, and a retorting process (130° C.×90 minutes) was conducted. Thereafter, the lid was taken-off, the cup was turned upside down, the content substance was released, and the level of the content substance remaining in the cup was observed. The cup was then shaken a couple of times with hand, and the content substance was retrieved. Then, the condition including the amount of remaining part of the content substance in the cup's internal side was observed. In this manner, the degree of the content-substance releasability was evaluated.

(Evaluations)

⊚: Condition in which the content substance can easily be released without sticking part being remained on the inner surface of the cup after releasing.

○: Condition in which it is difficult to release the content substance just by shaking the cup with hand; however, the content substance can easily be released using a spoon or a similar implement with substantially no sticking part being remained on the inner surface of the cup after releasing.

x: Condition in which it is difficult to release the content substance just by shaking the cup, the content substance cannot be released unless it is moved out using a spoon or other implement, and much part still remaining on the inner surface of the cup is recognizable even after the move-out action.

(6) Formability

After wax application over the laminate metal plate, circular sheets each having a diameter of 179 mm were punched out, and shallow-drawn cans were thereby obtained at a draw ratio of 1.60. Subsequently, redrawing processes were performed for the individual cups at a draw ratio of 2.10 and a draw ratio of 2.80. Then, doming is performed therefor according to a known technique, trimming is performed, and neckin-flanging processing is then performed. Deep-drawn cans were formed in this manner. The damage degree of each of the films was visually observed paying attention to the neckin portion of each deep-drawn can thus obtained.

(Evaluations)

⊚: A condition in which no damage nor film-peeling is recognized in the postformation film.

○: A condition in which formation is possible, but film-peeling is recognized.

x: A condition in which the can body is broken to an extent that formation is impossible.

(7) Adhesion Property

For cans having been formable in (6), peel-testing samples (width 15 mm×length 120 mm) were each cut out from a can body portion. A portion of the film was peeled off from a long-side end portion of the cut-off sample, and the film in the peeled off portion was opened in the direction opposite to the chromium plated steel sheet (angle: 180°) wherefrom the film was peeled off. Then, using a tensile tester, peel testing was conducted for the peeled-off film at a tensile speed of 30 mm/min, and the adhesion was evaluated. The adhesion-measurement object surface was selected from the inner surface side of the can.

(Evaluations)

⊚: 1.47 N/15 mm or higher (0.15 kgf/15 mm or higher)

○: 0.98 N/15 mm or higher, and lower than 1.47 N/15 mm (0.10 kgf/15 mm or higher, and lower than 0.15 kgf/15 mm)

x: Lower than 0.98 N/15 mm (lower than 0.10 kgf/15 mm)

(8) Impact Resistance

For cans having been formable in (6), the cans were each filled with water, 10 cans each per testing were dropped onto a vinyl-chloride tiled floor from a portion of a height of 1.25 m. Thereafter, a voltage of 6 V was applied to electrodes and the metal cans, current values were read out after three seconds, and average values were obtained in units of tested 10 cans.

(Evaluations)

⊚: Lower than 0.01 mA

○: 0.01 mA or higher, lower than 0.01 mA x: 0.1 mA or higher (9) Quality Stability Regarding the impact resistance in (8), a standard deviation of each of the measurement values is obtained, and a variation coefficient thereof is calculated from the equation "standard deviation/measurement value×100" (%). Based on the results, evaluations were performed in accordance with the following criteria:

(Evaluations)

○: lower than 10% x: 10% or higher

(10) Flavor-Retaining Characteristics

Regarding each of the cans having been formable in (6), after the can was subjected to a retorting process (120° C.×30 min.), the can was filled with 350 ml of aromatic aqueous solution d-limonene 25-ppm aqueous solution. The can was hermetically packed at 40° C., was maintained for 45 days, and was then unpacked. In this manner, variations in odor were evaluated by functional testing in accordance with the following criteria:

⊚: No odor variation is recognized.
○: Substantially no odor variations are recognized.
Δ: Slight odor variations are recognized.
x: Significant odor variations are recognized.

The evaluation results are shown in Table 5. As shown in Tables 4 and 5, any inventive example of Embodiment 2 exhibited high characteristics in quality stability.

Among inventive examples, those containing the carnauba wax or ester stearate as the wax component exhibited relatively higher content-substance releasability. Relatively higher formability was attained in the case of having a region where the value of the film birefringence is 0.02 or lower is smaller than 5 μm in thickness from the contact interface with the metal sheet.

In comparison, however, comparative examples out of the scope of Embodiment 2 were found deficient in the content-substance releasability and flavor-retaining characteristics or in the quality stability.

In Table 4, notes 1) to 4) indicate as follows:
1) PET: Polyethylene terephthalate
2) PET/I(12): Isophthalic acid-copolymerized polyethylene terephthalate (Numeric value: Copolymerization ratio (%))
3) Stearyl stearate: Ester stearate (C18-C18)
4) The wax added only to the resin film that is to be positioned on the outer surface side of the container.

TABLE 4

| Category | Material film | | | | | | | | Layer thickness of post-lamination film region where birefringence is 0.02 or lower (μm) |
|---|---|---|---|---|---|---|---|---|---|
| | Film | Ethylene terephthalate unit (mol %) | Wax[4] Type | Wax[4] Addition amount (% by mass) | Film thickness (μm) | Melting point (° C.) | Crystal size × (nm) | Orientation coefficient | |
| Inventive example 1 | PET[1] | 98 | Carnauba | 0.50 | 15 | 255 | 5.1 | 0.126 | 2 |
| Inventive example 2 | PET | 97 | Carnauba | 0.75 | 15 | 253 | 4.8 | 0.116 | 2 |
| Inventive example 3 | PET | 95 | Carnauba | 0.10 | 15 | 251 | 4.3 | 0.114 | 2 |
| Inventive example 4 | PET | 98 | Carnauba | 1.50 | 15 | 255 | 3.6 | 0.126 | 2 |
| Inventive example 5 | PET | 98 | Stearyl stearate[3] | 0.50 | 15 | 255 | 4.2 | 0.145 | 2 |
| Inventive example 6 | PET | 98 | Stearyl stearate | 0.75 | 15 | 255 | 4.5 | 0.129 | 2 |
| Inventive example 7 | PET | 98 | Silicone | 1.50 | 15 | 255 | 4.6 | 0.132 | 2 |
| Inventive example 8 | PET | 98 | Carnauba | 0.50 | 15 | 255 | 4.6 | 0.122 | 2 |
| Inventive example 9 | PET | 98 | Carnauba | 0.50 | 15 | 255 | 5.2 | 0.135 | 2 |
| Inventive example 10 | PET | 98 | Carnauba | 0.50 | 15 | 255 | 4.7 | 0.135 | 2 |
| Inventive example 11 | PET | 98 | Carnauba | 0.50 | 15 | 255 | 4.1 | 0.135 | 2 |
| Inventive example 12 | PET | 98 | Carnauba | 0.50 | 25 | 255 | 3.7 | 0.135 | 2 |
| Inventive example 13 | PET | 97 | Carnauba | 0.50 | 12 | 251 | 4.8 | 0.148 | 2 |
| Inventive example 14 | PET | 98 | Carnauba | 0.50 | 15 | 255 | 5.0 | 0.147 | 4 |
| Inventive example 15 | PET | 98 | Carnauba | 0.50 | 15 | 255 | 5.2 | 0.138 | 1 |
| Inventive example 16 | PET | 98 | Carnauba | 0.50 | 15 | 255 | 4.9 | 0.148 | 8 |
| Inventive example 17 | Two-layer PET | 98 | Carnauba (Addition only to upper layer) | 0.50 | 1(upper layer)/14 (lower layer) | 255 | 4.6 | 0.135 | 2 |
| Inventive example 18 | Two-layer PET | 98 | Carnauba (Addition only to upper layer) | 0.75 | 3(upper layer)/12 (lower layer) | 255 | 4.6 | 0.135 | 2 |
| Inventive example 19 | PET | 98 | Carnauba | 0.50 | 15 | 255 | 4.8 | 0.152 | 2 |
| Comparative example 1 | PET | 98 | — | — | 15 | 255 | 4.1 | 0.145 | 2 |
| Comparative example 2 | PET | 98 | Carnauba | 0.05 | 15 | 255 | 4.6 | 0.148 | 2 |

TABLE 4-continued

| Category | Film | Ethylene terephthalate unit (mol %) | Wax[4] Type | Wax[4] Addition amount (% by mass) | Film thickness (μm) | Melting point (°C.) | Crystal size × (nm) | Orientation coefficient | Layer thickness of post-lamination film region where birefringence is 0.02 or lower (μm) |
|---|---|---|---|---|---|---|---|---|---|
| Comparative example 3 | PET | 98 | Stearyl stearate | 0.05 | 15 | 255 | 4.2 | 0.135 | 2 |
| Comparative example 4 | PET/I(12)[2] | 87 | Carnauba | 0.50 | 15 | 229 | 3.9 | 0.135 | 2 |
| Comparative example 5 | PET | 89 | Carnauba | 0.50 | 15 | 230 | 4.0 | 0.142 | 2 |
| Comparative example 6 | PET | 98 | Carnauba | 0.50 | 15 | 255 | 7.0 | 0.132 | 2 |

TABLE 5

| No. | Content-substance releasability | Formability | Adhesion property | Impact resistance | Quality stability | Flavor-retaining characteristics |
|---|---|---|---|---|---|---|
| Inventive example 1 | ◎ | ◎ | ◎ | ◎ | ○ | ○ |
| Inventive example 2 | ◎ | ◎ | ◎ | ◎ | ○ | ○ |
| Inventive example 3 | ○ | ◎ | ◎ | ◎ | ◎ | ○ |
| Inventive example 4 | ◎ | ◎ | ◎ | ◎ | ○ | ○ |
| Inventive example 5 | ◎ | ◎ | ◎ | ◎ | ○ | ○ |
| Inventive example 6 | ◎ | ◎ | ◎ | ◎ | ○ | ○ |
| Inventive example 7 | ○ | ◎ | ◎ | ◎ | ○ | ○ |
| Inventive example 8 | ◎ | ◎ | ◎ | ◎ | ○ | ○ |
| Inventive example 9 | ◎ | ◎ | ◎ | ◎ | ○ | ○ |
| Inventive example 10 | ◎ | ○ | ◎ | ◎ | ○ | ○ |
| Inventive example 11 | ◎ | ◎ | ◎ | ◎ | ○ | ○ |
| Inventive example 12 | ◎ | ◎ | ◎ | ◎ | ○ | ○ |
| Inventive example 13 | ◎ | ◎ | ◎ | ◎ | ○ | ○ |
| Inventive example 14 | ◎ | ◎ | ◎ | ◎ | ○ | ○ |
| Inventive example 15 | ◎ | ◎ | ◎ | ◎ | ○ | ○ |
| Inventive example 16 | ◎ | ○ | ◎ | ◎ | ○ | ○ |
| Inventive example 17 | ◎ | ◎ | ◎ | ◎ | ○ | ○ |
| Inventive example 18 | ◎ | ◎ | ◎ | ◎ | ○ | ○ |
| Inventive example 19 | ◎ | ○ | ◎ | ◎ | ○ | ○ |
| Comparative example 1 | X | ◎ | ◎ | ◎ | ○ | ○ |
| Comparative example 2 | X | ◎ | ◎ | ◎ | ○ | ○ |
| Comparative example 3 | X | ◎ | ◎ | ◎ | ○ | ○ |
| Comparative example 4 | ◎ | ◎ | ○ | ○ | ○ | Δ |

TABLE 5-continued

| No. | Content-substance releasability | Formability | Adhesion property | Impact resistance | Quality stability | Flavor-retaining characteristics |
|---|---|---|---|---|---|---|
| Comparative example 5 | ◎ | ◎ | ○ | ○ | ○ | Δ |
| Comparative example 6 | ◎ | ◎ | ◎ | ◎ | X | ○ |

Embodiment 3

The inventors discovered that a film laminate metal plate excellent in formability, postprocessing adhesion property, content-substance releasability, flavor-retaining characteristics, and quality stability can be obtained in such a manner that polyester containing ethylene terephthalate as a main component is biaxially oriented, and a wax component is added to the biaxially oriented polyester film in which a crystal orientation parameter R obtained through X-ray diffraction measurement is $20 \times 10^{-2}$ or greater. More specifically, essentials of Embodiment 3 are described hereunder.

(1) A film-laminated metal sheet for container including a resin film A and a resin film B, the resin film A being a biaxially oriented polyester film formed of polyester in which 93 mol % or more of structure units are ethylene terephthalate units and a crystal orientation parameter R obtained through X-ray diffraction measurement is $20 \times 10^{-2}$ or greater, and the resin film B being a biaxially oriented polyester film and containing 0.1 to 2.0% in a ratio by mass of a wax component, the film-laminated metal sheet for container being characterized in that the resin film B is laminated over a surface of the metal sheet that is to be positioned on the inner surface side of the container after formation of the container, and the resin film A is laminated over a surface of the metal sheet that is to be positioned on the outer surface side of the container after formation of the container.

(2) A film-laminated metal sheet for container according to (1), characterized by containing carnauba wax or ester stearate as the wax component.

(3) A film-laminated metal sheet for container according to (1) or (2), characterized in that a region where the birefringence of each of the resin film A and the resin film B after lamination is 0.02 or lower is smaller than 5 µm from a contact interface with the metal sheet in the thickness direction.

(4) A film-laminated metal sheet for container according to any one of (1) to (3), characterized in that the polyester does not contain isophthalic acid as the polyester structure component.

(5) A film-laminated metal sheet for container according to any one of (1) to (4), characterized in that the resin film B contains 0.0001 to 1% in a ratio by mass of an antioxidant with respect to the resin.

(6) A film-laminated metal sheet for container according to any one of (1) to (5), characterized in that the density of each of the resin film A and the resin film B is 1.400 g/cm³ or lower.

(7) A film-laminated metal sheet for container according to any one of (1) to (6), characterized in that the resin film B is constituted of at least two or more layers, and the resin film B is formed such that only an uppermost layer to be in contact with the content substance contains 0.1 to 2.0% in a ratio by mass of the wax component with respect to the resin.

The Embodiment 3 will be described hereinbelow in detail.

In the Embodiment 3, a polyester film is used for the films (the resin film A and the resin film B), and 93 mol % or more of the structure units of the polyester are ethylene terephthalate units. The ethylene terephthalate units need to be 93 mol % or more in content to obtain excellent flavor-retaining characteristics after a heat treatment such as a retorting process. To maintain the flavor-retaining characteristics excellent even in long time storage of beverage in the metal can, and the content is preferably 96 mol % or more. For use in the case of strictly requiring flavor-retaining characteristics, the content is preferably 98 mol % or more. In the Embodiment 3, the "excellent flavor-retaining characteristics" refers to a level at which the flavor of the content substance is not deteriorated by, for example, adsorption of an aromatic component of the content substance of the can to the film and/or by an eluted substance from the film.

Other components, such as a dicarboxylic acid component and glycol component, may be copolymerized in a range that does not reduce the flavor-retaining characteristics. Illustrative examples of the dicarboxylic acid include aromatic dicarboxylic acids such as diphenyl carboxylic acid, 5-sodium sulfoisophthalate, and phthalic acid; and aliphatic dicarboxylic acids such as oxalic acid, succinic acid, adipic acid, sebacic acid, dimer acid, maleic acid, and fumaric acid; aliphatic dicarboxylic acid such as cyclohexanedicarboxylic acid; and oxycarboxlic acid such as p-oxybenzoic acid.

Illustrative examples of the glycol component include aliphatic glycols, such as ethylene glycol, propanediol, butanediol, pentanediol, hexanediol, and neopentyl glycol; alicyclic glycols such as cyclohexane dimethanol; aromatic glycols such as bisphenol A and bisphenol S; diethylene glycol; and polyethylene glycol. Among these types of dicarboxylic acid components and glycol components, two or more types may be used in combination.

As long as effects of Embodiment 3 are not interfered, multifunctional compounds, such as trimellitic acid, trimesic acid, trimethylol propane, may be copolymerized.

Examples of components slightly contained in the polyester used in the Embodiment 3 include, diethylene glycol, polyethylene glycol, cyclohexane dimethanol, sebacic acid, and dimer acid.

Embodiment 3 permits two or more polymers to be blended for use. For the film to be used in Embodiment 3, isophthalic acid may be copolymerized in a range that does not significantly deteriorates the characteristics. However, the film is preferably of polyester not containing isophthalic acid to prevent time-dependent deterioration in impact resistance and flavor-retaining characteristics.

For the film to be used in Embodiment 3, the polyester, in which 93 mol % or more of the structure units are ethylene terephthalate units, need to be biaxially oriented. The technique for biaxial orientation may be either a synchronous biaxial orientation technique or a sequential biaxial orientation technique. The biaxially oriented film offers advantages in laminatability. Specifically, even when slight temperature variations have taken place during lamination, post-lamination variations in formability and impact resistance can be reduced. Consequently, relatively higher steady and excellent formability and impact resistance can be secured. From this viewpoint, the crystal orientation parameter R obtained through X-ray diffraction measurement is $20 \times 10^{-2}$ or greater, preferably $25 \times 10^{-2}$ or greater, more preferably $30 \times 10^{-2}$ or greater, and still more preferably $40 \times 10^{-2}$. Crystal orientation parameters R of presently available films are 50 or smaller, and the inventors confirmed that laminatabilities of films up to the aforementioned crystal size are excellent. When the crystal orientation parameter R is smaller than $20 \times 10^{-2}$, the laminatability is insufficient, and variations in the formability and the impact resistance are increased.

The crystal orientation parameter R is obtained in accordance with an intensity ratio between the (1-10) surface and the (100) that can be obtained through reflection X-ray diffraction measurement. The crystal orientation parameter greater than $20 \times 10^{-2}$ is determined depending on, for example, the polymer constituting the film, addition substance, orientation conditions, and heat treatment conditions. The crystal size can be achieved by setting of these conditions to appropriate conditions. For example, the size value can be attained by increasing the drawing temperature, reducing the drawing size scale, and reducing the heat treatment temperature and time. In this case, however, the values need to be within ranges that satisfy the characteristics required for the film. A preferable heat treatment time is 6 sec or shorter, and more preferably 5 sec or shorter.

In Embodiment 3, the resin film (resin film B) to be positioned on the inner surface side of the container after formation of the container is defined to be the polyester film that contains 0.1 to 2.0% in a ratio by mass of a wax component with respect to the resin. The wax component is added as an addition substance ① to reduce the surface energy of the film and ② to impart lubricity to the surface. The effect of ① makes it difficult for the content substance to adhere to the film, and the effect of ② decreases a friction coefficient of the film surface. These effects enable the content-substance releasability to be significantly enhanced.

Reasons for restricting the content of the wax component to 0.1% or higher are that, at a ratio lower than 0.1%, the effects of ① and ② are reduced, and the content-substance releasability is therefore deteriorated. On the other hand, the content is limited to 2.0% or lower for the reason that a content exceeding 2.0% causes the content-substance releasability to be substantially saturated and disables a significant effect to be obtained. In addition, the exceeding ratio falls in a range that causes difficulty in film deposition technique, consequently leading to low productivity and high costs.

For the wax component, an organic or inorganic lubricant material is usable. Particularly, an organic lubricant material such as an aliphatic-acid ester is preferable. A more preferable component is a vegetable-type, natural-type wax, specifically a carnauba wax (a main component thereof is $CH_3(CH_2)_{24}COO(CH_2)_{29}CH_3$, and the wax contains various other components composed of aliphatic groups and alcohol), or ester stearate. Either of these components is preferable as it exhibits significant effects ① and ②, and has a molecular structure allowing easy inclusion into the film. The polyester film containing the wax can be manufactured by an ordinary deposition technique after the wax is blended with the polyester.

The effects described above cannot be obtained in such a way that a wax component is coated over a film surface. This is because canned foods and the like are subjected to retort processing for infection after the content substance is packaged, and a precoated wax is absorbed into the content substance during the retort processing. However, as in Embodiment 3, in the case where the wax is added to the film, the wax slowly appears over the surface with its density increasing. Consequently, the wax is not absorbed overall into the content substance, therefore enabling the above-described effects to be securely exhibited.

The structure of the film after being laminated over the metal sheet is preferably such that a region where the birefringence thereof is 0.02 or lower is smaller than 5 μm from a contact interface with the metal sheet in the thickness direction. According to an ordinary manufacturing method of a laminate metal sheet, the metal sheet is bonded with a film such that the film is placed in contact with the heated metal sheet, is then compressed thereonto to cause a film resin on a metal sheet interface to melt, and is then wetted on the metal sheet. As such, the film needs to be in a melted state to secure the adhesion property between the film and the metal sheet. Accordingly, the film birefringence of a portion in contact with the metal sheet after lamination is naturally reduced. As defined in the present embodiment of the invention, if the film birefringence of the contact is 0.02 or lower, the state indicates that the molten-film wet at the time of lamination has been sufficient. Thereby, high adhesion property can be secured.

The thickness of the region where the birefringence thereof is 0.02 or lower is preferably smaller than 5 μm from the contact interface with the metal sheet. Reasons therefor are described hereunder.

The film of the invention has high processability through control of the crystal orientation parameter R. However, when the film is completely melted, the crystal structure thereof collapses, and crystallization easily occurs in subsequent processing and heat treatment. This leads to deterioration in the processability.

Molten wetting of the film is indispensably required to secure the film adhesion property, as described above. In this regard, the inventors conducted extensive researches and studies. As a result, the portion where the film is melted, that is, where the birefringence is 0.2 or lower was restricted to be smaller than 5 μm. This enables the adhesion property to be secured, and concurrently enables the processability and the impact resistance to be compatibly maintained at high levels.

For the film to be used in the Embodiment 3, 0.0001 to 1% in a ratio by mass of a known antioxidant with respect to the resin is preferably added to improve the impact resistance. A more preferable amount of the antioxidant to be added is 0.001 to 0.1% by mass. Further, diethylene glycol may be added to the film within a range that does not reduce the characteristics.

To improve the formability, the density of the film is preferably 1.400 g/cm$^3$ or lower, more preferably 1.399 g/cm$^3$ or lower, and still more preferably 1.398 g/cm$^3$ or lower.

The structure of the resin film to be used in the Embodiment 4 may be either a single layer structure or a multilayer structure. However, in the case of a multilayer structure, a wax needs to be added to an uppermost layer of the film (resin film B) that is to be in contact with the content substance. In view of economy, the wax is preferably added only to the uppermost layer of the film.

The thickness of the overall film is preferably in a range of 3 to 50 μm, and more preferably in a range of 8 to 30 μm, to secure the formability after lamination of the film to the metal, the coverage with respect to the metal, the impact resistance, and the flavor-retaining characteristics.

While no particular limitations are placed for a manufacturing method for the film itself (including a multilayer film), an example method is described hereunder. After individual polyester resins are dried by necessity, a resin and/or individual resins are fed into a well-known molten-lamination extruder. Then, the resin is extruded from a slit-shaped die in a sheet-like shape. The sheet-like resin is then adhesively placed on the surface of a casting drum by using an electrostatic application technique or the like so as to be cooled and solidified. Thereby, an unoriented sheet is obtained.

The unoriented sheet is then stretched or oriented in the direction of the film length and the direction of the film width, whereby a biaxially oriented film is obtained. The orientation ratio may be arbitrarily set corresponding to, for example, the degree of orientation, strength, and elasticity of the objective film. In view of quality, however, the ratio is preferably set by using a tenter technique. Particularly, a sequential biaxial orientation technique and a sequential biaxial orientation technique are preferable. In the former technique, a material is oriented in the longitudinal direction and is then oriented in the width direction. In the synchronous biaxial orientation technique, a material is oriented synchronously in both the longitudinal and width direction.

Subsequently described hereinbelow is a method for manufacturing a laminate metal sheet in stages where the films are laminated over the metal sheet. The present case of the invention employs a method in which a metal sheet is heated to a temperature exceeding the melting point of the film, and a compressively bonding rolls (which hereinbelow will be referred to as "laminate rolls") are used to render the resin film to be in contact with two surfaces of the metal sheet and to then be thermally fusion bonded thereonto.

Laminating conditions are not particularly limited as long as they are appropriate to enable film structure defined in Embodiment 3 to be obtained. For example, preferably, the temperature at laminating commencement time is 280° C. or higher, and the time in which the film is in contact at a temperature higher than the melting point thereof is in a range of 1 to 20 msec as a history of temperatures applied to the film at the time of lamination. To achieve the laminating conditions, not only high-speed lamination, but also cooling during adhesion is necessary. While the pressure to be applied at the time of lamination is not particularly limited, it is preferably in a range of 1 to 30 kgf/cm$^2$ as a surface pressure. If the pressure value is excessively low, even at a temperature not lower than the melting point, since the time is short, securing sufficient adhesion property is difficult. In contrast, at an excessively high pressure, while no inconveniences take place in performance of the laminate metal sheet, the force exerted on the laminate roll is large. Accordingly, since high strengths are required for relevant facilities, larger facilities are required. This is uneconomical.

For the metal sheet, an aluminum sheet, low carbon steel sheet, or the like that is widely used as a can material may be used. Particularly, for example, a surface-treated steel sheet (one of so-called "TFS" sheets) formed of two layer films made, wherein the lower layer is formed of a metalchrome and the upper layer is formed of a chromium hydroxide substance material, is most suitable.

Deposition amounts of the metalchrome layer and chromium hydroxide substance layer of the TFS are not particularly limited. However, in view of postprocessing adhesion property and anticorrosion resistance, the deposition amounts in Cr conversion are preferably in a range of 70 to 200 mg/m$^2$ for metalchrome layer and in a range of 10 to 30 mg/m$^2$.

EXAMPLE

A chromium plated steel sheet was manufactured using a steel sheet that has a thickness of 0.18 mm and a width of 977 mm and that was cold-rolled, annealed, and then temper-rolled. The steel sheet was then subjected to degreasing, acid cleaning, and chromium plating. The chromium plating was conducted in a chromium plating bath containing $CrO^3$, $F^-$, and $SO_4^{2-}$, was subjected to intermediate rinsing, and was then subjected to electrolysis using a chemical treatment liquid containing $CrO_3$ and $F^-$. At this event, electrolysis conditions (such as the electric density and electricity quantity) were adjusted to thereby adjust the metalchrome deposition amount and the chromium-hydroxide-substance deposition amount.

Subsequently, laminate metal strips were manufactured by using a laminating apparatus shown in FIG. 2. A chromium plated steel sheet 1 of the type obtained as described above was heated using a metal-strip heating apparatus 2. Laminate rolls 3 were used to laminate individual resin films 4a and 4b, as shown in Table 4, on surfaces of the chromium plated steel sheet 1. Specifically, on one of the surface of the chromium plated steel strip 1, the resin film 4a was laminated as a resin film (resin film B) to be positioned on the inner surface side of the container after formation of the container. On the other surface, the resin film 4b was laminated (thermally fusion-bonded) as a resin film (resin film A) to be positioned on the outer surface side of the container after formation of the container. The resin film 4a, which is to be positioned on the outer surface side of the container after formation of the container, was manufactured using a material of the resin film 4b to which the wax is added. The contents of the laminated resin films are shown in Table 6. The laminate roll 3 is of an internal water cooled type, whereby cooling water was forcedly circulated during lamination to perform cooling during bonding of the film.

Characteristics of the used biaxially oriented polyester films were measured and evaluated in manners described in (1) to (3) below. In addition, characteristics of the laminate metal plate manufactured in the manner described above were measured and evaluated in manners described in (4) to (9) below. Films in (1) and (2) are prelamination material films.

(1) Crystal Orientation Parameter R

The crystal orientation parameter R was obtained using the intensities of the (1-10) surface and the (100) plane, intensities having been obtained through reflection X-ray diffraction measurement by using an equation given below. The measurement X-ray wavelength was set to 0.15418 nm (CuKα). The (1-10) surface analysis was observed at a Bragg angle of 11.3°, and the (100) plane analysis was observed at a Bragg angle of 12.7°.

$$R = H/h + 0.015$$

Where;

H: Peak intensity value in (1-10) surface analysis h: Peak intensity value in (100) plane analysis (2) Film Density The film densities were each obtained according to a density gradient technique using a water-potassium bromide aqueous solution.

(3) Birefringence of Polyester Film

The retardation in the cross-sectional direction of the film after the metal sheet of the laminate metal plate has been removed was measured using a polarizing microscope. According to the result, the birefringence in the cross-sectional direction of each of the films was obtained.

(4) Content-Substance Releasability

At a drawing step using a drawing and forming machine, the laminate metal plate was formed into cups under conditions in which a blank diameter is set to 100 mm and a draw ratio (preformation diameter/postformation diameter) is set to 1.88. Subsequently, content substance made by uniformly mixing eggs, meat, and oatmeal was filled into each of the formed cups, a lid was spin-pressed down onto the cup, and a retorting process (130° C.×90 minutes) was conducted. Thereafter, the lid was taken off, the cup was turned upside down, the content substance was released, and the level of the content substance remaining in the cup was observed. The cup was then shaken a couple of times with hand, and the content substance was retrieved. Then, the condition including the amount of remaining part of the content substance in the cup's internal side was observed. In this manner, the degree of the content-substance releasability was evaluated.

(Evaluations)

⊚: Condition in which the content substance can easily be released without sticking part being remained on the inner surface of the cup after releasing.

○: Condition in which it is difficult to release the content substance just by shaking the cup with hand; however, the content substance can easily be released using a spoon or a similar implement with substantially no sticking part being remained on the inner surface of the cup after releasing.

x: Condition in which it is difficult to release the content substance just by shaking the cup, the content substance cannot be released unless it is moved out using a spoon or other implement, and much part still remaining-on the inner surface of the cup is recognizable even after the move-out action.

(5) Formability

After wax application over the laminate metal plate, circular sheets each having a diameter of 179 mm were punched out, and shallow-drawn cans were thereby obtained at a draw ratio of 1.60. Subsequently, redrawing processes were performed for the individual cups at a draw ratio of 2.10 and a draw ratio of 2.80. Then, doming is performed therefor according to a known technique, trimming is performed, and neckin-flanging processing is then performed. Deep-drawn cans were formed in this manner. The damage degree of each of the films was visually observed paying attention to the neckin portion of each deep-drawn can thus obtained.

(Evaluations)

⊚: A condition in which no damage-nor film-peeling is recognized in the postformation film.

○: A condition in which formation is possible, but film-peeling is recognized.

x: A condition in which the can body is broken to an extent that formation is impossible.

(6) Adhesion Property

For cans having been formable in (6), peel-testing samples (width 15 mm×length 120 mm) were each cut out from a can body portion. A portion of the film was peeled off from a long-side end portion of the cut-off sample, and the film in the peeled off portion was opened in the direction opposite to the chromium plated steel sheet (angle: 180°) wherefrom the film was peeled off. Then, using a tensile tester, peel testing was conducted for the peeled-off film at a tensile speed of 30 mm/min, and the adhesion was evaluated. The adhesion-measurement object surface was selected from the inner surface side of the can.

(Evaluations)

⊚: 1.47 N/15 mm or higher (0.15 kgf/15 mm or higher)

○: 0.98 N/15 mm or higher, and lower than 1.47 N/15 mm (0.10 kgf/15 mm or higher, and lower than 0.15 kgf/15 mm)

x: Lower than 0.98 N/15 mm (lower than 0.10 kgf/15 mm)

(7) Impact Resistance

For cans having been formable in (5), the cans were each filled with water, 10 cans each per testing were dropped onto a vinyl-chloride tiled floor from a portion of a height of 1.25 m. Thereafter, a voltage of 6 V was applied to electrodes and the metal cans, current values were read out after three seconds, and average values were obtained in units of tested 10 cans.

(Evaluations)

⊚: Lower than 0.01 mA

○: 0.01 mA or higher, lower than 0.01 mA x: 0.1 mA or higher (8) Quality Stability Regarding the impact resistance in (7), a standard deviation of each of the measurement values is obtained, and a variation coeffcient thereof is calculated from the equation "standard deviation/measurement value×100" (%). Based on the results, evaluations were performed in accordance with the following criteria:

(Evaluations)

○: lower than 10% x: 10% or higher (9) Flavor-Retaining Characteristics

Regarding each of the cans having been formable in (5), after the can was subjected to a retorting process (120° C.×30 min.), the can was filled with aromatic aqueous solution d-limonene 25-ppm aqueous solution. The can was hermetically packed at 40° C., was maintained for 45 days, and was then unpacked. In this manner, variations in odor were evaluated by functional testing in accordance with the following criteria:

○: Substantially-no odor-variations are recognized.

Δ: Slight odor variations are recognized.

x: Significant odor variations are recognized.

The evaluation results are shown in Table 7. As shown in Tables 6 and 7, any inventive example of Embodiment 3 exhibited high characteristics in quality stability.

In Table 6, notes 1) to 4) indicate as follows:

1) PET: Polyethylene terephthalate
2) PET/I(12): Isophthalic acid-copolymerized polyethylene terephthalate (Numeric value: Copolymerization ratio (%))
3) Stearyl stearate: Ester stearate (C18-C18)
4) The wax added only to the resin film that is to be positioned on the outer surface side of the container.

Among inventive examples, those containing the carnauba wax or ester stearate as the wax component exhibited relatively higher content-substance releasability. Relatively higher formability was attained in the case of having a region where the value of the film birefringence is 0.02 or lower is smaller than 5 μm in thickness from the contact interface with the metal sheet.

In comparison, however, comparative examples out of the scope of Embodiment 3 were found deficient in the content-substance releasability and flavor-retaining characteristics or in the quality stability.

TABLE 6

| Category | Film | Material film Ethylene terephthalate unit (mol %) | Wax[4] Type | Wax[4] Addition amount (% by mass) | Film thickness (μm) | Crystal orientation parameter R (×10$^{-2}$) | Density (g/cm$^3$) | Layer thickness of post-lamination film region where birefringence is 0.02 or lower (μm) |
|---|---|---|---|---|---|---|---|---|
| Inventive example 1 | PET[1] | 98 | Carnauba | 0.50 | 15 | 24.9 | 1.394 | 2 |
| Inventive example 2 | PET | 97 | Carnauba | 0.75 | 15 | 32.8 | 1.394 | 2 |
| Inventive example 3 | PET | 95 | Carnauba | 0.10 | 15 | 21.0 | 1.394 | 2 |
| Inventive example 4 | PET | 98 | Carnauba | 1.50 | 15 | 31.2 | 1.394 | 2 |
| Inventive example 5 | PET | 98 | Stearyl stearate[3] | 0.50 | 15 | 46.0 | 1.394 | 2 |
| Inventive example 6 | PET | 98 | Stearyl stearate | 0.75 | 15 | 42.1 | 1.394 | 2 |
| Inventive example 7 | PET | 98 | Silicone | 1.50 | 15 | 26.4 | 1.394 | 2 |
| Inventive example 8 | PET | 98 | Carnauba | 0.50 | 15 | 49.1 | 1.394 | 2 |
| Inventive example 9 | PET | 98 | Carnauba | 0.50 | 15 | 24.9 | 1.394 | 2 |
| Inventive example 10 | PET | 98 | Carnauba | 0.50 | 15 | 24.9 | 1.391 | 2 |
| Inventive example 11 | PET | 98 | Carnauba | 0.50 | 15 | 24.9 | 1.391 | 2 |
| Inventive example 12 | PET | 98 | Carnauba | 0.50 | 25 | 24.9 | 1.391 | 2 |
| Inventive example 13 | PET | 97 | Carnauba | 0.50 | 12 | 32.8 | 1.391 | 2 |
| Inventive example 14 | PET | 98 | Carnauba | 0.50 | 15 | 21.0 | 1.391 | 4 |
| Inventive example 15 | PET | 98 | Carnauba | 0.50 | 15 | 31.2 | 1.391 | 1 |
| Inventive example 16 | PET | 98 | Carnauba | 0.50 | 15 | 46.0 | 1.391 | 8 |
| Inventive example 17 | Two-layer PET | 98 | Carnauba (Addition only to upper layer) | 0.50 | 1(upper layer)/ 14(lower layer) | 24.9 | 1.394 | 2 |
| Inventive example 18 | Two-layer PET | 98 | Carnauba (Addition only to upper layer) | 0.75 | 3(upper layer)/ 12(lower layer) | 24.9 | 1.391 | 2 |
| Comparative example 1 | PET | 98 | — | — | 15 | 32.8 | 1.394 | 2 |
| Comparative example 2 | PET | 98 | Carnauba | 0.05 | 15 | 21.0 | 1.394 | 2 |
| Comparative example 3 | PET | 98 | Stearyl stearate | 0.05 | 15 | 31.2 | 1.394 | 2 |
| Comparative example 4 | PET/I(12)[2] | 87 | Carnauba | 0.50 | 15 | 46.0 | 1.391 | 2 |
| Comparative example 5 | PET | 89 | Carnauba | 0.50 | 15 | 24.9 | 1.391 | 2 |
| Comparative example 6 | PET | 98 | Carnauba | 0.50 | 15 | 17.2 | 1.391 | 2 |

TABLE 7

| No. | Evaluation result Content-substance releasability | Formability | Adhesion property | Impact resistance | Quality stability | Flavor-retaining characteristics |
|---|---|---|---|---|---|---|
| Inventive example 1 | ◎ | ◎ | ◎ | ◎ | ○ | ○ |
| Inventive example 2 | ◎ | ◎ | ◎ | ◎ | ○ | ○ |
| Inventive example 3 | ○ | ◎ | ◎ | ◎ | ○ | ○ |

TABLE 7-continued

| | Evaluation result | | | | | |
|---|---|---|---|---|---|---|
| No. | Content-substance releasability | Formability | Adhesion property | Impact resistance | Quality stability | Flavor-retaining characteristics |
| Inventive example 4 | ◎ | ◎ | ◎ | ◎ | ○ | ○ |
| Inventive example 5 | ◎ | ◎ | ◎ | ◎ | ○ | ○ |
| Inventive example 6 | ◎ | ◎ | ◎ | ◎ | ○ | ○ |
| Inventive example 7 | ○ | ◎ | ◎ | ◎ | ○ | ○ |
| Inventive example 8 | ◎ | ◎ | ◎ | ◎ | ○ | ○ |
| Inventive example 9 | ◎ | ◎ | ◎ | ◎ | ○ | ○ |
| Inventive example 10 | ◎ | ○ | ◎ | ◎ | ○ | ○ |
| Inventive example 11 | ◎ | ◎ | ◎ | ◎ | ○ | ○ |
| Inventive example 12 | ◎ | ◎ | ◎ | ◎ | ○ | ○ |
| Inventive example 13 | ◎ | ◎ | ◎ | ◎ | ○ | ○ |
| Inventive example 14 | ◎ | ◎ | ◎ | ◎ | ○ | ○ |
| Inventive example 15 | ◎ | ◎ | ◎ | ◎ | ○ | ○ |
| Inventive example 16 | ◎ | ○ | ◎ | ◎ | ○ | ○ |
| Inventive example 17 | ◎ | ◎ | ◎ | ◎ | ○ | ○ |
| Inventive example 18 | ◎ | ◎ | ◎ | ◎ | ○ | ○ |
| Comparative example 1 | X | ◎ | ◎ | ◎ | ○ | ○ |
| Comparative example 2 | X | ◎ | ◎ | ◎ | ○ | ○ |
| Comparative example 3 | X | ◎ | ◎ | ◎ | ○ | ○ |
| Comparative example 4 | ◎ | ◎ | ○ | ○ | ○ | Δ |
| Comparative example 5 | ◎ | ◎ | ○ | ○ | ○ | Δ |
| Comparative example 6 | ◎ | ◎ | ◎ | ◎ | X | ○ |

Embodiment 4

The inventors discovered that the objects can be achieved in such a manner that a wax component is added to a biaxially oriented polyester film that has been highly controlled with respect to the film structure thereof without substantially including isophthalic acid component. More specifically, essentials of Embodiment 4 are described hereunder.

(1) A film-laminated metal sheet for container including a resin film A and a resin film B, the resin film A being a biaxially oriented polyester film characterized in that a melting point is 240 to 300° C., the content of a terminal carboxyl group is 10, to 50 equivalent/ton, and an isophthalic acid component is not substantially contained as an acid component, and the resin film B being a biaxially oriented polyester film containing 0.10 to 2.0% in a ratio by mass of a wax component with respect to the resin, the film-laminated metal sheet for container being characterized in that the resin film B is laminated over a surface of the metal sheet that is to be positioned on the inner surface side of the container after formation of the container, and the resin film A is laminated over a surface of the metal sheet that is to be positioned on the outer surface side of the container after formation of the container.

(2) A film-laminated metal sheet for container according to (1), characterized by containing carnauba wax or ester stearate as the wax component.

(3) A film-laminated metal sheet for container according to claim 1 or 2, characterized in that a region where the birefringence of each of the resin film A and the resin film B after lamination is 0.02 or lower is smaller than 5 μm from a contact interface with the metal sheet in the thickness direction.

(4) A film-laminated metal sheet for container according to any one of (1) to (3), characterized in that 95% or more in a ratio by mass of polyester units constituting the resin film B are ethylene terephthalate units and/or ethylene naphthalate units.

(5) A film-laminated metal sheet for container according to any one of (1) to (4), characterized in that a thickness-direction refractive index of the resin film B is 1.500 or higher.

(6) A film-laminated metal sheet for container according to any one of (1) to (5), characterized in that a relaxation time the resin film B in a structure analysis according to a high solid resolution NMR is 270 msec or longer.

(7) A film-laminated metal sheet for container according to any one of (1) to (6), characterized in that the resin film B is constituted of at least two or more layers, and the resin film B is formed such that only an uppermost layer to be in contact with the content substance contains 0.10 to 2.0% in a ratio by mass of the wax component with respect to the resin.

The Embodiment 4 will be described hereinbelow in detail.

In the Embodiment 4, a polyester film is used for the films (the resin film A and the resin film B), and the polyester needs to have a DSC-measurement melting point (melting peak temperature) of 240 to 300° C. secure excellent flavor-retaining characteristics. However, the melting point is preferably in a range of 245 to 300° C. and more preferably in a range of 246 to 300° C. In the Embodiment 4, the "excellent flavor-retaining characteristics" refers to a level at which the flavor of the content substance is not deteriorated by, for example, adsorption of an aromatic component of the content substance of the can to the film and/or by an eluted substance from the film.

In addition, the film to be used in Embodiment 4 needs to be formed such that the content of the terminal carboxyl group is 10 to 50 equivalent/ton to secure excellent adhesion property and excellent post-retorting flavor-retaining characteristics. Since the terminal carboxyl group has polarity, an increase in the content thereof works to secure excellent adhesion property. On the other hand, however, the increase causes a flavor component of the content substance to easily be absorbed, thereby deteriorating the flavor-retaining characteristics. If the content of terminal carboxyl group is lower than 10 equivalent/ton, excellent adhesion property cannot be secured. On the other hand, if the content of terminal carboxyl group exceeds 15 equivalent/ton, the flavor-retaining characteristics are deteriorated. To store the content substance for long time, the content of terminal carboxyl group of the polyester is preferably in a range of 15 to 48 equivalent/ton and more preferably in a range of 15 to 45 equivalent/ton.

The polyester to be used in Embodiment 4 is required not to substantially contain the isophthalic acid component as an acid component. The polyester preferably contains ethylene terephthalate and/or ethylene naphthalate to suppress abrasion dust occurring in manufacturing steps. The expression that isophthalic acid is not substantially included means that isophthalic acid is not intentionally included; that is, the isophthalic acid is not included except that it is unavoidably entrained as impurity.

A film-containing low molecular weight component insufficient in polymerization degree can easily be eluted into a content substance such as a beverage, thereby leading to deterioration in flavor-retaining characteristics. That is, with the polyester-substantially not containing the isophthalic acid component, the film-containing low molecular weight component insufficient in polymerization degree is decreased. Accordingly, the low molecular weight component being eluted into the content substance is decreased, and deterioration in flavor-retaining characteristics can be prevented.

The polyester containing ethylene terephthalate and/or ethylene naphthalate as main components specifically refers to a polyester in which 95% or more in a ratio by mass of the polyester are ethylene terephthalate and/or ethylene naphthalate as composition elements. To maintain the flavor-retaining characteristics excellent even in long time storage of the content substance in the metal can, the content is preferably 97% by mass or more.

Other components, such as a dicarboxylic acid component and glycol component, may be copolymerized in a range that does not deteriorate the flavor-retaining characteristics. Illustrative examples of the dicarboxylic acid include aromatic dicarboxylic acids such as diphenyl carboxylic acid, 5-sodium sulfoisophthalate, and phthalic acid; and aliphatic dicarboxylic acids such as oxalic acid, succinic acid, adipic acid, sebacic acid, dimer acid, maleic acid, and fumaric acid; aliphatic dicarboxylic acid such as cyclohexanedicarboxylic acid; and oxycarboxlic acid such as p-oxybenzoic acid.

Illustrative examples of the glycol component include aliphatic glycols, such as ethylene glycol, propanediol, butanediol, pentanediol, hexanediol, and neopentyl glycol; alicyclic glycols such as cyclohexane dimethanol; aromatic glycols such as bisphenol A and bisphenol S; diethylene glycol; and polyethylene glycol. Among these types of dicarboxylic acid components and glycol components, two or more types may be used in combination.

As long as effects of Embodiment 4 are not interfered, multifunctional compounds, such as trimellitic acid, trimesic acid, trimethylol propane, may be copolymerized.

Examples of components slightly contained in the polyester used in the Embodiment 4 include, diethylene glycol, polyethylene glycol, cyclohexane dimethanol, sebacic acid, and dimer acid. For use in the case of strictly requiring flavor-retaining characteristics, examples thereof include diethylene glycol and polyethylene glycol.

Embodiment 4 defines that the resin film (resin film B) to be positioned on the inner surface side of the container after formation of the container contains 0.10 to 2.0% in a ratio by mass of a wax component with respect to the resin. The wax component is included as an addition substance ① to reduce the surface energy of the film and ② to impart lubricity to the surface. The effect of ① makes it difficult for the content substance to adhere to the film, and the effect of ② decreases a friction coefficient of the film surface. These effects enable the content-substance releasability to be significantly enhanced.

Reasons for restricting the content of the wax component to 0.10% or higher are that, at a ratio lower than 0.10%, the effects of ① and ② are reduced, and the content-substance releasability is therefore deteriorated. On the other hand, the content is limited to 2.0% or lower for the reason that a content exceeding 2.0% causes the content-substance releasability to be substantially saturated and disables a significant effect to be obtained. In addition, the exceeding ratio falls in a range that causes difficulty in film deposition technique, consequently leading to low productivity and high costs.

For the wax component, an organic or inorganic lubricant material is usable. Particularly, an organic lubricant material such as an aliphatic-acid ester is preferable. A more preferable component is a vegetable-type, natural-type wax, specifically a carnauba wax (a main component thereof is $CH_3(CH_2)_{24}COO(CH_2)_{29}CH_3$, and the wax contains various other components composed of aliphatic groups and alcohol), or ester stearate. Either of these components is preferable as it exhibits significant effects ① and ②, and has a molecular structure allowing easy inclusion into the film. The polyester film containing the wax can, be manufactured by an ordinary deposition technique after the wax is blended with the polyester.

The effects described above cannot be obtained in such a way that a wax component is coated over a film surface. This is because canned foods and the like are subjected to retort processing for sterilization after the content substance is packaged, and a precoated wax is absorbed into the content substance during the retort processing. However, as in Embodiment 4, in the case where the wax is added to the film, the wax slowly appears over the surface with its density increasing. Consequently, the wax is not absorbed overall into the content substance, therefore enabling the above-described effects to be securely exhibited.

The structure of the film after being laminated over the metal sheet is preferably such that a region where the birefringence thereof is 0.02 or lower is smaller than 5 μm from a contact interface with the metal sheet in the thickness direction. According to an ordinary manufacturing method of a laminate metal sheet, the metal sheet is bonded with a film such that the film is placed in contact with the heated metal sheet, is then compressed thereonto to cause a film resin on a metal sheet interface to melt, and is then wetted on the metal sheet. As such, the film needs to be in a melted state to secure the adhesion property between the film and the metal sheet. Accordingly, the film birefringence of a portion in contact with the metal sheet after lamination is naturally reduced.

As restricted in Embodiment 4, if the film birefringence of the contact is 0.02 or lower, the state indicates that the molten-film wet at the time of lamination has been sufficient. Thereby, high adhesion property can be secured.

The thickness of the region where the birefringence thereof is 0.02 or lower is preferably smaller than 5 μm from the contact interface with the metal sheet. Reasons therefor are described hereunder.

The film to be used in Embodiment 4 is characterized by low molecule mobility represented by a relaxation time T1ρ of a carbonyl portion in a structure analysis through a high solid resolution NMR. As such, while having high formability and impact resistance, the film has drawbacks in that when the film is completely melted, the effect thereof decreases, and crystallization easily takes place in subsequent processing and heat treatment, thereby deteriorating processability of the film.

However, as described above, the molten wetting of the film is indispensable to secure the film adhesion property. In this regard, the inventors conducted extensive researches and studies. As a result, the thickness of the portion where the film is melted, that is, where the birefringence is 0.2 or lower was restricted to be smaller than 5 μm. This enables the adhesion property to be secured, and concurrently enables the processability and the impact resistance to be compatibly maintained at high levels.

To secure the heat resistance and flavor-retaining characteristics, the film to be used in Embodiment 4 is required to be a film formed such that the polyester is biaxially oriented. The technique of biaxial orientation may be either a synchronous biaxial orientation technique or a sequential biaxial orientation technique. However, to secure excellent laminatability and drawing formability, orientation conditions and heat treatment conditions are preferably specified, whereby the thickness-direction refractive index is restricted to 1.500 or higher. The thickness-direction refractive index is more preferably set to 1.510 or higher and still more preferably 1.520 or higher. These settings enable control the in-plane orientation coefficient to a range of in-plane orientation coefficients required to compatibly secure the formability and impact resistance even when slight temperature variations have taken place during lamination.

In addition, for the biaxially oriented polyester film to be used in Embodiment 4, the relaxation time T1ρ of the carbonyl portion in the structure analysis through the high solid resolution NMR is preferably 270 msec or longer. This is preferable to improve the formability in the case of forming a neck portion after application of a history of heat of about 200 to 300° C. after drawing formation during can manufacturing steps.

Further, the film to be used in Embodiment 4 is preferably characterized in that a thermal crystallization parameter ΔTcg (temperature-rise thermal crystallization temperature-glass transition temperature) of the polyester is in a range between 60° C. or higher and 150° C. or lower and more preferably in a range between 70° C. or higher and 150° C. or lower. The technique of imparting such thermal crystalinity can be implemented by controlling catalysts, molecular weights, and contents of diethylene glycols.

The structure of the resin film used in the Embodiment 4 may be either a single layer structure or a multilayer structure. However, in the case of the multilayer structure, a wax needs to be added to an uppermost layer of the film (resin film B) that is to be in contact with the content substance. In view of economy, the wax is preferably added only to the uppermost layer of the film. The thickness of the overall film is preferably in a range of 3 to 50 μm and more preferably in a range of 8 to 30 μm, to secure the formability after lamination of the film to the metal, the coverage with respect to the metal, the impact resistance, and the flavor-retaining characteristics.

While no particular limitations are placed for a manufacturing method for the film itself (including a multilayer film), an example method is described hereunder. After individual polyester resins are dried by necessity, a resin and/or individual resins are fed into a well-known molten-lamination extruder. Then, the resin is extruded from a slit-shaped die in a sheet-like shape. The sheet-like resin is then adhesively placed on the surface of a casting drum by using an electrostatic application technique or the like so as to be cooled and solidified. Thereby, an unoriented sheet is obtained.

The unoriented sheet is then stretched or oriented in the direction of the film length and the direction of the film width, whereby a biaxially oriented film is obtained. The orientation ratio may be arbitrarily set corresponding to, for example, the degree of orientation, strength, and elasticity of the objective film. In view of quality, however, the ratio is preferably set by using a tenter technique. Particularly, a sequential biaxial orientation technique and a sequential biaxial orientation technique are preferable. In the former technique, a material is oriented in the longitudinal direction and is then oriented in the width direction. In the synchronous biaxial orientation technique, a material is oriented synchronously in both the longitudinal and width direction.

Subsequently described hereinbelow is a method for manufacturing a laminate metal sheet in stages where the films are laminated over the metal sheet. The present case of the invention employs a method in which a metal sheet is heated to a temperature exceeding the melting point of the film, and a compressively bonding rolls (which hereinbelow will be referred to as "laminate rolls") are used to render the resin film to be in contact with two surfaces of the metal sheet and to then be laminated (thermally fusion bonded) thereonto.

Laminating conditions are not particularly limited as long as they are appropriate to enable film structure defined in Embodiment 4 to be obtained. For example, preferably, the temperature at laminating commencement time is set to 280°

C. or higher, and the time in which the film is in contact at a temperature higher than the melting point thereof is set to a range of 1 to 20 msec as a history of temperatures applied to the film at the time of lamination. To achieve the laminating conditions, not only high-speed lamination, but also cooling during adhesion is necessary. While the pressure to be applied at the time of lamination is not particularly limited, it is preferably in a range of 1 to 30 kgf/cm$^2$ as a surface pressure. If the pressure value is excessively low, even at a temperature not lower than the melting point, since the time is short, securing sufficient adhesion property is difficult. In contrast, at an excessively high pressure, while no inconveniences take place in performance of the laminate metal sheet, the force exerted on the laminate roll is large. Accordingly, since high strengths are required for relevant facilities, larger facilities are required. This is uneconomical.

For the metal sheet, an aluminum sheet, low carbon steel sheet, or the like that is widely used as a can material may be used. Particularly, for example, a surface-treated steel sheet (one of so-called "TFS" sheets) formed of two layer films made, wherein the lower layer is formed of a metalchrome and the upper layer is formed of a chromium hydroxide substance material, is most suitable. Deposition amounts of the metalchrome layer and chromium hydroxide substance layer of the TFS are not particularly limited. However, in view of postprocessing adhesion property and anticorrosion resistance, the deposition amounts in Cr conversion ate preferably in a range of 70 to 200 mg/m$^2$ for metalchrome layer and in a range of 10 to 30 mg/m$^2$.

EXAMPLE

A chromium plated steel sheet was manufactured using a steel sheet that has a thickness of 0.18 mm and a width of 977 mm and that was cold-rolled, annealed, and then temper-rolled. The steel sheet was then subjected to degreasing, acid-cleaning, and chromium plating. The chromium plating was conducted in a chromium plating bath containing $CrO^3$, $F^-$, and $SO_4^{2-}$, was subjected to intermediate rinsing, and was then subjected to electrolysis using a chemical treatment liquid containing $CrO_3$ and $F^-$. At this event, electrolysis conditions (such as the electric density and electricity quantity) were adjusted to thereby adjust the metalchrome deposition amount and the chromium-hydroxide-substance deposition amount to 120 mg/m$^2$ and 15 mg/m$^2$, respectively.

Subsequently, laminate metal strips were manufactured by using a laminating apparatus shown in FIG. 2. A chromium plated steel sheet 1 of the type obtained as described above was heated using a metal-strip heating apparatus 2. Laminate rolls 3 were used to laminate individual resin films 4a and 4b, as shown in Table 1, on surfaces of the chromium plated steel sheet 1. Specifically, on one of the surfaces of the chromium plated steel strip 1, the resin film 4a was laminated as a resin film (resin film B) to be positioned on the inner surface side of the container after formation of the container. On the other surface, the resin film 4b was laminated (thermally fusion-bonded) as a resin film (resin film A) to be positioned on the outer surface side of the container after formation of the container. The resin film 4a, which is to be positioned on the outer surface side of the container after formation of the container, was manufactured using a material of the resin film 4b to which the wax is added. The contents of the laminated resin films are shown in Table 8. The laminate roll 3 is of an internal water cooled type, whereby cooling water was forcedly circulated during lamination to perform cooling during bonding of the film.

Characteristics of the used biaxially oriented polyester films were measured and evaluated in manners described in (1) to (3) below. Characteristics of the laminate metal plate manufactured in the above-described technique are measured and evaluated in manners described in (6) to (10) below. Films in (1) to (4) are prelamination material films. The characteristics in (1), (3), and (4) do not vary even after lamination.

(1) Amount of Terminal Carboxyl Units of Polyester

The polyester was dissolved into o-cresol/chloroform (mass ratio: 7/3) under the conditions of 90 to 100° C. and 20 minutes, and the amount was obtained through a potentiometric titration with alkali.

(2) Thickness-Direction Refractive Index of Film

With a sodium D ray (wavelength: 589 nm) being used as a light source, the refractive index was measured using an Abbe refractometer.

(3) Melting Point of Polyester

The polyester was crystallized, and the melting point thereof was measured using a differential scanning calorimeter (model DSC-2 supplied by PerkinElmer, Inc.) at a temperature rise rate of 16° C./min.

(4) Relaxation Time $T1\rho$ through High Solid Resolution NMR

Measuring apparatuses used for measuring solid NMR are a spectrometer JNM-GX270 supplied by Nihon Denshi, a solid amplifier supplied by Nihon Denshi, a MAS controller NM-GSH27MU supplied by Nihon Denshi, and a probe NM-GSH27T supplied by Nihon Denshi. Measurements were each performed for $T1\rho$ (vertical relaxation in a rotating frame) of $^{13}C$ nucleus performed. In the measurements, under a temperature of 24.5° C., a humidity of 50% RH, and a static magnetic field intensity of 6.34 T (Tesla), resonant frequencies of 1H and 13C were 270.2 MHz and 67.9 MHz, respectively. A MAS (magic angle rotation) technique was employed to eliminate the influence of anisotropy in chemical shift. The number of rotations was in a range of 3.5 to 3.7 kHz. Conditions of the pulse sequence were set to 90° for 1H, a pulsewidth of 4 μsec, and a locking magnetic field strength of 62.5 kHz. A contact time of CP (crosspolarization) for shifting the polarization of 1H was 1.5 msec. Holding times τ were set to 0.001, 0.5, 0.7, 1, 3, 7, 10, 20, 30, 40, and 50 msec. A free induction decay (FID) of a 13C magnetization vector after each of the holding times τ (During the FID measurement, high power coupling was performed to eliminate the influence of dipole interaction caused by 1H. To enhance S/N, 512 integrations were executed). The pulse repletion time was set to a range of between 5 to 15 sec.

Ordinarily, a $T1\rho$ value can be expressed by the equation "$I(t)=\Sigma(Ai)\exp(-t/T1\rho i)$," and a peak intensity observed with respect to each holding time is semilogarithmically plotted, and the $T1\rho$ value can be obtained from a skew in the plotting. In this equation, "Ai" represents the ratio of the component with respect to "$T1\rho i$."

In the present case, the analysis was performed in a two-component system ($T1\rho 1$: amorphous component; and $T1\rho 2$:

crystal component), and the value was obtained through least-squares-method fitting by using the following expression:

$$I(t)=fa1\cdot\exp(-t/T1\rho1)+fa2\cdot\exp(-t/T1\rho2)$$

Where,
fa1: Ratio of component with respect to T1ρ1
fa2: Ratio of component with respect to T1ρ2
fa1+fa2=1
In the present case, T1ρ1 is used for T1ρ.

(5) Birefringence of Polyester Film

Using a polarizing microscope, a measurement was performed to obtain the retardation in the cross-sectional direction of the resin film after removal of the metal sheet of the laminate metal plate. Based on the result, the birefringence in the cross-sectional direction of the film was measured.

(6) Content-Substance Releasability

At a drawing step, by using a drawing and forming machine, the laminate metal plate was formed into cups under conditions in which a blank diameter is set to 100 mm and a draw ratio (preformation diameter/postformation diameter) is set to 1.88. Subsequently, a content substance made by uniformly mixing eggs, meat, and oatmeal was filled into each of the formed cups, a lid was spin-pressed down onto the cup, and a retorting process (130° C.×90 minutes) was conducted. Thereafter, the lid was taken off, the cup was turned upside down, the content substance was released, and the level of the content substance remaining in the cup was observed. The cup was then shaken a couple of times with hand, and the content substance was retrieved. Then, the state including the amount of remaining part of the content substance in the cup's internal side was observed. In this manner, the degree of the content-substance releasability was evaluated.

Evaluations

◎: Condition in which the content substance can easily be released without sticking part being remained on the inner surface of the cup after releasing.

○: Condition in which it is difficult to release the content substance just by shaking the cup with hand; however, the content substance can easily be released using a spoon or a similar implement with substantially no sticking part being remained on the inner surface of the cup after releasing.

x: Condition in which it is difficult to release the content substance just by shaking the cup, the content substance cannot be released unless it is moved out using a spoon or other implement, and much part still remaining on the inner surface of the cup is recognizable even after the move-out action.

(7) Formability

After wax application over the laminate metal plate, circular sheets each having a diameter of 179 mm were punched out, and shallow-drawn cups were thereby obtained at a draw ratio of 1.60. Subsequently, redrawing processes were performed for the individual cups at a draw ratio of 2.10 and a draw ratio of 2.80. Then, doming is performed therefor according to a known technique, trimming is performed, and neckin-flanging processing is then performed. Thereby, deep-drawn cups were obtained. The damage degree of each of the films was visually observed paying attention to the neckin portion of each deep-drawn cup thus obtained.

Evaluations

◎: A condition in which no damage nor film-peeling is recognized in the postformation film.

○: A condition in which formation is possible, but film-peeling is recognized.

x: A condition in which the can body broken to an extent that formation is impossible.

(8) Adhesion Property

For cans having been formable in (7), peel-testing samples (width 15 mm×length 120 mm) were each cut out from a can body portion. A portion of the film was peeled off from a long-side end portion of the cut-off sample, and the film in the peeled-off portion was opened in the direction opposite to the chromium plated steel sheet (angle: 180°) wherefrom the film was peeled off. Then, using a tensile tester, peel testing was conducted for the peeled-off film at a tensile speed of 30 mm/min, and the adhesion per width of 15 mm was evaluated. The adhesion-measurement object surface was selected from the inner surface side of the can.

Evaluations

◎: 1.47 N/15 mm or higher (0.15 kgf/15 mm or higher)

○: 0.98 N/15 mm or higher, and lower than 1.47 N/15 mm (0.10 kgf/15 mm or higher, and lower than 0.15 kgf/15 mm)

x: Lower than 0.98 N/15 mm (lower than 0.10 kgf/15 mm)

(9) Impact Resistance

For cans having been formable in (7), the cans were each filled with water, 10 cans each per testing were dropped onto a vinyl-chloride tiled floor from a portion of a height of 1.25 m. Thereafter, a voltage of 6 V was applied to electrodes and the metal cans, current values were read out after three seconds, and average values were obtained in units of tested 10 cans.

Evaluations

◎: Lower than 0.01 mA

○: 0.01 mA or higher, lower than 0.01 mA x: 0.1 mA or higher

(10) Flavor-Retaining Characteristics

Regarding each of the cans having been formable in (7), after the can was subjected to a retorting process (120° C.×30 min.), the can was filled with aromatic aqueous solution d-limonene 25-ppm aqueous solution. The can was hermetically packed at 40° C., was maintained for 45 days, and was then unpacked. In this manner, variations in odor were evaluated by functional testing in accordance with the following criteria:

○: Substantially no odor variations are recognized.

Δ: Slight odor variations are recognized.

x: Significant odor variations are recognized.

The evaluation results are shown in Table 9. As shown in Tables 8 and 9, any inventive example of Embodiment 4 exhibited high characteristics in the content-substance releasability, formability, adhesion property, impact resistance, and flavor-retaining characteristics.

In Table 8, notes 1) to 4) indicate as follows:
1) PET: Polyethylene terephthalate
2) PET/1(12): Isophthalic acid-copolymerized polyethylene terephthalate (Numeric value: Copolymerization ratio (%))
3) Stearyl stearate: Ester stearate (C18-C18)
4) The wax added only to the resin film that is to be positioned on the outer surface side of the container.

Among inventive examples, those containing the carnauba wax or ester stearate as the wax component exhibited relatively higher content-substance releasability. Relatively higher formability was attained in the case of having a region where the value of the film birefringence is 0.02 or lower is smaller than 5 μm in thickness from the contact interface with the metal sheet. In addition, the impact resistance and the flavor-retaining characteristics were found relatively-higher in the case where 95% or more in a ratio by mass of the polyester units constituting the film are ethylene terephthalate units.

In comparison, however, comparative examples out of the scope of Embodiment 4 were found to be deficient in at least one of the content-substance releasability, flavor-retaining characteristics, and formability.

TABLE 8

| Category | Film | Ethylene terephthalate unit (mol %) | Wax[4] Type | Wax[4] Addition amount (% by mass) | Film thickness (μm) | Melting point (°C.) | Carboxyl group equivalent (ton) | Thickness-direction refractive index | NMR relaxation time(msec) | Layer thickness of post-lamination film region where birefringence is 0.02 or lower (μm) |
|---|---|---|---|---|---|---|---|---|---|---|
| Inventive example 1 | PET[1] | 98 | Carnauba | 0.50 | 15 | 255 | 33 | 1.521 | 310 | 2 |
| Inventive example 2 | PET | 97 | Carnauba | 0.75 | 15 | 253 | 33 | 1.511 | 290 | 2 |
| Inventive example 3 | PET | 95 | Carnauba | 0.10 | 15 | 251 | 31 | 1.528 | 310 | 2 |
| Inventive example 4 | PET | 98 | Carnauba | 1.50 | 15 | 255 | 33 | 1.518 | 280 | 2 |
| Inventive example 5 | PET | 98 | Stearyl stearate[3] | 0.50 | 15 | 255 | 31 | 1.537 | 370 | 2 |
| Inventive example 6 | PET | 98 | Stearyl stearate | 0.75 | 15 | 255 | 33 | 1.526 | 330 | 2 |
| Inventive example 7 | PET | 98 | Silicone | 1.50 | 15 | 255 | 33 | 1.518 | 390 | 2 |
| Inventive example 8 | PET | 98 | Carnauba | 0.50 | 15 | 255 | 33 | 1.511 | 320 | 2 |
| Inventive example 9 | PET | 98 | Carnauba | 0.50 | 15 | 255 | 19 | 1.511 | 310 | 2 |
| Inventive example 10 | PET | 98 | Carnauba | 0.50 | 15 | 255 | 25 | 1.521 | 280 | 2 |
| Inventive example 11 | PET | 98 | Carnauba | 0.50 | 15 | 255 | 33 | 1.521 | 340 | 2 |
| Inventive example 12 | PET | 98 | Carnauba | 0.50 | 25 | 255 | 30 | 1.522 | 340 | 2 |
| Inventive example 13 | PET | 97 | Carnauba | 0.50 | 12 | 251 | 33 | 1.523 | 280 | 2 |
| Inventive example 14 | PET | 98 | Carnauba | 0.50 | 15 | 255 | 33 | 1.512 | 350 | 4 |
| Inventive example 15 | PET | 98 | Carnauba | 0.50 | 15 | 255 | 33 | 1.522 | 390 | 1 |
| Inventive example 16 | PET | 98 | Carnauba | 0.50 | 15 | 255 | 31 | 1.522 | 280 | 8 |
| Inventive example 17 | Two-layer PET | 98 | Carnauba (Addition only to upper layer) | 0.50 | 1(upper layer)/ 14(lower layer) | 255 | 33 | 1.521 | 340 | 2 |
| Inventive example 18 | Two-layer PET | 98 | Carnauba (Addition only to upper layer) | 0.75 | 3(upper layer)/ 12(lower layer) | 255 | 33 | 1.511 | 320 | 2 |
| Inventive example 19 | PET | 93 | Carnauba | 0.50 | 15 | 242 | 33 | 1.521 | 320 | 2 |
| Inventive example 20 | PET | 98 | Carnauba | 0.50 | 15 | 255 | 33 | 1.490 | 280 | 2 |
| Inventive example 21 | PET | 98 | Carnauba | 0.50 | 15 | 255 | 33 | 1.511 | 250 | 2 |
| Comparative example 1 | PET | 98 | — | — | 15 | 255 | 33 | 1.521 | 310 | 2 |
| Comparative example 2 | PET | 98 | Carnauba | 0.05 | 15 | 255 | 33 | 1.521 | 310 | 2 |
| Comparative example 3 | PET | 98 | Stearyl stearate | 0.05 | 15 | 255 | 33 | 1.521 | 280 | 2 |
| Comparative example 4 | PET/I(12)[2] | 87 | Carnauba | 0.50 | 15 | 229 | 39 | 1.512 | 260 | 2 |
| Comparative example 5 | PET | 89 | Carnauba | 0.50 | 15 | 230 | 40 | 1.521 | 220 | 2 |
| Comparative example 6 | PET | 85 | Carnauba | 0.50 | 15 | 255 | 8 | 1.492 | 300 | 2 |
| comparative example 7 | PET | 89 | Carnauba | 0.50 | 15 | 255 | 52 | 1.521 | 230 | 2 |

TABLE 9

| No. | Evaluation result | | | | |
|---|---|---|---|---|---|
| | Content-substance releasability | Formability | Adhesion property | Impact resistance | Flavor-retaining characteristics |
| Inventive example 1 | ◎ | ◎ | ◎ | ◎ | ○ |
| Inventive example 2 | ◎ | ◎ | ◎ | ◎ | ○ |
| Inventive example 3 | ○ | ◎ | ◎ | ◎ | ○ |
| Inventive example 4 | ◎ | ◎ | ◎ | ◎ | ○ |
| Inventive example 5 | ◎ | ◎ | ◎ | ◎ | ○ |
| Inventive example 6 | ◎ | ◎ | ◎ | ◎ | ○ |
| Inventive example 7 | ○ | ◎ | ◎ | ◎ | ○ |
| Inventive example 8 | ◎ | ◎ | ◎ | ◎ | ○ |
| Inventive example 9 | ◎ | ◎ | ◎ | ◎ | ○ |
| Inventive example 10 | ◎ | ◎ | ◎ | ◎ | ○ |
| Inventive example 11 | ◎ | ◎ | ◎ | ◎ | ○ |
| Inventive example 12 | ◎ | ◎ | ◎ | ◎ | ○ |
| Inventive example 13 | ◎ | ◎ | ◎ | ◎ | ○ |
| Inventive example 14 | ◎ | ◎ | ◎ | ◎ | ○ |
| Inventive example 15 | ◎ | ◎ | ◎ | ◎ | ○ |
| Inventive example 16 | ◎ | ○ | ◎ | ◎ | ○ |
| Inventive example 17 | ◎ | ◎ | ◎ | ◎ | ○ |
| Inventive example 18 | ◎ | ◎ | ◎ | ◎ | ○ |
| Inventive example 19 | ◎ | ○ | ○ | ◎ | ○ |
| Inventive example 20 | ◎ | ○ | ◎ | ○ | ○ |
| Inventive example 21 | ◎ | ○ | ○ | ◎ | ○ |
| Comparative example 1 | X | ◎ | ◎ | ◎ | ○ |
| Comparative example 2 | X | ◎ | ◎ | ◎ | ○ |
| Comparative example 3 | X | ◎ | ◎ | ◎ | ○ |
| Comparative example 4 | ◎ | ◎ | ○ | ○ | Δ |
| Comparative example 5 | ◎ | ◎ | ○ | ○ | Δ |
| Comparative example 6 | ◎ | ○ | X | ○ | Δ |
| Comparative example 7 | ◎ | ○ | ○ | ○ | X |

Embodiment 5

The inventors discovered that the objects can be achieved in such a manner that a wax component is added to a film controlled in amorphous Young's modulus attributable to a film amorphous component. This led to the present embodiment.

More specifically, essentials of Embodiment 5 are described hereunder.

(1) A film-laminated metal sheet for container including a resin film A and a resin film B, the resin film A being a biaxially oriented polyester film characterized in that an amorphous Young's is in a range of 120 to 220 kg/mm$^2$ and the resin film B being a biaxially oriented polyester film containing 0.10 to 2.0% in a ratio by mass of a wax component with respect to the resin, the film-laminated metal sheet for container being characterized in that the resin film B is laminated over a surface of the metal sheet that is to be positioned on the inner surface side of the container after formation of the container, and the resin film A is laminated over a surface of the metal sheet that is to be positioned on the outer surface side of the container after formation of the container.

(2) A film-laminated metal sheet for container according to (1), characterized by containing carnauba wax or ester stearate as the wax component.

(3) A film-laminated metal sheet for container according to (1) or 2, characterized in that the biaxially oriented polyester film is biaxially oriented polyester film having an amorphous Young's modulus of 140 to 200 kg/$mm^2$.

(4) A film-laminated metal sheet for container according to any one of (1) to (3), characterized in that a region where the birefringence of each of the resin film A and the resin film B after lamination is 0.02 or lower is smaller than 5 μm from a contact interface with the metal sheet in the thickness direction.

(5) A film-laminated metal sheet for container according to any one of (1) to (4), characterized in that 95% or more in a ratio by mass of polyester units constituting the resin film B are ethylene terephthalate units and/or ethylene naphthalate units.

(6) A film-laminated metal sheet for container according to any one of (1) to (5), characterized in that each of the resin film A and the resin film B is constituted of at least two layers, and the difference between intrinsic viscosities of a laminate layer contacting the metal sheet and a layer other than the laminate layer is in a range of 0.01 to 0.5.

(7) A film-laminated metal sheet for container according to any one of (1) to (6), characterized in that the resin film B is constituted of at least two or more layers, and the resin film B is formed such that only an uppermost layer to be in contact with the content substance contains 0.10 to 2.0% in a ratio by mass of the wax component with respect to the resin.

The Embodiment 5 will be described hereinbelow in detail.

In the Embodiment 5, the films (the resin film A and the resin film B) to be used need to have an amorphous Young's modulus of 120 to 220 kg/mm$^2$ in each of the longitudinal direction and the direction perpendicular thereto in order to exhibit high formability, impact resistance, and retort-whitening resistance. A film has more or less an amorphous-structure region(s), and the abundance ratio thereof increases along with the history of heat during lamination. As such, what governs the characteristics of the metal sheet after lamination is rather the film amorphous region, and appropriately controlling the values of mechanical properties thereof is to be important.

The inventors discovered that the mechanical properties of the laminate metal sheet can be effectively controlled by varying the amorphous Young's modulus of the film. Specifically, the formability and impact resistance can be significantly enhanced through control of the amorphous Young's modulus to an appropriate range.

Additionally, Embodiment 5 is characterized in that the retort-whitening resistance is high. "Retorting" refers to sterilization processing that is performed when food products are packaged into cans, the processing is performed in compressed steam at 125° C. for 30 minutes. An amorphous region of a film is known to be crystallized so as to easily form a spherulite structure. A generated spherulite structure irregularly reflects visible light, so that the film surface after retorting is seen white to the human eye. This is a phenomenon referred to as "retort-whitening," which causes nonuniformity in color tone and hence reduces the commercial value.

The inventors paid attention to the mobility of the film amorphous region and discovered that the mobility can be controlled using Young's moduli as objective factors. That is, a method was discovered in which the factors are controlled to an appropriate range to suppress the formation of the spherulite structure, consequently enabling the post-retort whitening to be effectively prevented.

The appropriate range of the amorphous Young's moduli will now be discussed here. When the amorphous Young's modulus at least one of the longitudinal direction and perpendicular direction is in a range lower than 120 kg/mm$^2$, the impact resistance was found to reduce the impact resistance after can fabrication. As such, this range is inappropriate. In contrast, when the amorphous Young's modulus at least one of the longitudinal direction and perpendicular direction is in a range exceeding 220 kg/mm$^2$, drawbacks take place. For example, an elongation percentage of the film is low, that is, the formability is low, consequently disabling sufficient can fabrication. As such, the range is inappropriate. In this case, the retort-whitening resistance also is deteriorated. Preferably, the amorphous Young's modulus is in a range of 140 to 200 kg/mm$^2$.

The amorphous Young's modulus is calculated according to an equation shown below, and the modulus is contemplated to represent amorphous-region elongatablility.

$$Ea=(1-\Phi)Ef$$

In the equation, Ea represents the amorphous Young's modulus, $\Phi$ represents crystalinity, and Ef represents the Young's modulus of the film. The crystalinity $\Phi$ is calculated using the following equation in accordance with a film density $\rho$ measured using a density gradient tube:

$$\Phi=(\rho-1.335)/0.12$$

Using a high-temperature orientation technique in the film manufacture enables the amorphous Young's modulus to be restricted to the range described above. However, the technique is hot limited, the range can be attained by appropriately controlling, for example, the intrinsic viscosity of the material, catalyst, content of diethylene glycol, orientation conditions, and heat treatment conditions.

In Embodiment 5, to secure high formability, the fracture elongation percentage of the film in each of longitudinal direction and the direction perpendicular thereto is preferably 170% or higher, more preferably 180% or higher, and still more preferably 200% or higher. When the fracture elongation percentage is in a range of lower than 170%, since the formability decreases, the range is not preferable.

The polyester to be used in Embodiment 5 is a polymer composed of a dicarboxylic acid component and a glycol component. Illustrative examples of the dicarboxylic acid component include aromatic dicarboxylic acids such as diphenyl carboxylic acid, 5-sodium sulfoisophthalate, and phthalic acid; and aliphatic dicarboxylic acids such as oxalic acid, succinic acid, adipic acid, sebacic acid, dimer acid, maleic acid, and fumaric acid; aliphatic dicarboxylic acid such as cyclohexanedicarboxylic acid; and oxycarboxlic acid such as p-oxybenzoic acid. Among these dicarboxylic acid components, the terephthalic acid is preferable in view of the heat resistance and flavor-retaining characteristics.

Illustrative examples of the glycol component include aliphatic glycols, such as ethylene glycol, propanediol, butanediol, pentanediol, hexanediol, and neopentyl glycol; alicyclic glycols such as cyclohexane dimethanol; aromatic glycols such as bisphenol A and bisphenol S; diethylene glycol; and polyethylene glycol. Among these types of dicarboxylic acid components and glycol components, two or more types may be used in combination.

As long as effects of Embodiment 5 are not interfered, multifunctional compounds, such as trimellitic acid, trimesic acid, trimethylol propane, may be copolymerized.

In Embodiment 5, in view of the heat resistance, the polyester preferably contains a metal compound arbitrarily selected from an antimony compound, a germanium compound, and a titanium compound. In this case, in view of the heat resistance and flavor-retaining characteristics, the content of the metal elements is preferably in a range of between 0.01 ppm of higher and lower than 1,000 ppm, more preferably in a range of between 0.05 ppm higher and lower than 800 ppm, and still more preferably in a range of between 0.1 ppm of higher and lower than 500 ppm.

As a preferable case, when mainly the germanium compound is included, flavor-retaining characteristics after application of a history of high temperatures in, for example, drying and retorting processing in the can manufacturing steps are improved. On the other hand, it is preferable to include mainly the antimony compound since the quantity of diethylene glycol undesirably generated can be reduced, and the heat resistance can be improved. In addition, a phosphorus compound may be added as a thermal stabilizer, the content thereof in mass ratio being 10 to 200 ppm, and preferably 15 to 100 ppm, with respect to the resin. While examples of the phosphorus compound include a phosphoric acid and a phosphite compound, no particular limitations are placed in this regard.

Further, depending on the necessity, an antioxidant, thermal stabilizer, UV absorber, placticizer, pigment, antistatic agent, crystalline nucleus, and the like may be blended.

Embodiment 5 defines that the resin film (resin film B) to be positioned on the inner surface side of the container after formation of the container contains 0.10 to 2.0% in a ratio by mass of a wax component with respect to the resin. The wax component is included as an addition substance ① to reduce the surface energy of the film and ② to impart lubricity to the surface. The effect of ① makes it difficult for the content substance to adhere to the film, and the effect of ② decreases a friction coefficient of the film surface. These effects enable the content-substance releasability to be significantly enhanced.

Reasons for restricting the content of the wax component to 0.10% or higher are that, at a ratio lower than 0.10%, the effects of ① and ② are reduced, and the content-substance releasability is therefore deteriorated. On the other hand, the content is limited to 2.0% or lower for the reason that a content exceeding 2.0% causes the content-substance releasability to be substantially saturated and disables a significant effect to be obtained. In addition, the exceeding ratio falls in a range that causes difficulty in film deposition technique, consequently leading to low productivity and high costs.

For the wax component, an organic or inorganic lubricant material is usable. Particularly, an organic lubricant material such as an aliphatic-acid ester is preferable. A more preferable component is a vegetable-type, natural-type wax, specifically a carnauba wax (a main component thereof is $CH_3(CH_2)_{24}COO(CH_2)_{29}CH_3$, and the wax contains various other components composed of aliphatic groups and alcohol), or ester stearate. Either of these components is preferable as it exhibits significant effects ① and ②, and has a molecular structure allowing easy inclusion into the film. The polyester film containing the wax can be manufactured by an ordinary deposition technique after the wax is blended with the polyester.

The effects described above cannot be obtained in such a way that a wax component is coated over a film surface. This is because canned foods and the like are subjected to retort processing for sterilization after the content substance is packaged, and a precoated wax is absorbed into the content substance during the retort processing. However, as in the present embodiment of the invention, in the case where the wax is added to the film, the wax slowly appears over the surface with its density increasing. Consequently, the wax is not absorbed overall into the content substance, therefore enabling the above-described effects to be securely exhibited.

The structure of the film after being laminated over the metal sheet is preferably such that a region where the birefringence thereof is 0.02 or lower is smaller than 5 μm from a contact interface with the metal sheet in the thickness direction. According to an ordinary manufacturing method of a laminate metal sheet, the metal sheet is bonded with a film such that the film is placed in contact with the heated metal sheet, is then compressed thereonto to cause a film resin on a metal sheet interface to melt, and is then wetted on the metal sheet. As such, the film needs to be in a melted state to secure the adhesion property between the film and the metal sheet. Accordingly, the film birefringence of a portion in contact with the metal sheet after lamination is naturally reduced.

The thickness of the region where the birefringence thereof is 0.02 or lower is preferably smaller than 5 μm from the contact interface with the metal sheet. Reasons therefor are described hereunder.

Drawbacks take place in that the effect of the amorphous Young's modulus of the film defined in the present embodiment of the invention is reduced when the film is completely melted, the effect thereof decreases, and crystallization easily takes place in subsequent processing and heat treatment, thereby deteriorating processability of the film. However, as described above, the molten wetting of the film is indispensable to secure the film adhesion property. In this regard, the inventors conducted extensive researches and studies. As a result, the thickness of the portion where the film is melted, that is, where the birefringence is 0.2 or lower was restricted to be smaller than 5 μm. This enables the adhesion property to be secured, and concurrently enables the processability and the impact resistance to be compatibly maintained at high levels.

The polyester described above preferably contains polyethylene terephthalate as a main component, in which 95 mol % or more of polyester units are ethylene terephthalate, units.

The structure of the resin film used in the Embodiment 5 may be either a single layer structure or a multilayer structure. However, in the case of a multilayered biaxially oriented polyester film constituted of at least two or more layers, the difference between intrinsic viscosities of a laminate layer to be positioned in contact with the metal sheet and a layer other than the laminate layer is preferably in a range of between 0.01 to 0.5. This is preferable for the film to exhibit high lamination characteristics and impact resistance. In the case of the multilayer structure, a wax needs to be added to an uppermost layer of the film (resin film B) that is to be in contact with the content substance. In view of economy, the wax is preferably added only to the uppermost layer of the film.

While no particular limitations are placed, the thickness of the film is preferably in a range of 5 to 60 μm, and more preferably in a range of 10 to 40 μm.

In addition, for the film to exhibit high formability, the in-plane orientation coefficient of the film before lamination is preferably 0.15 or less. An in-plane orientation coefficient in excess of 0.15 causes the orientation of the overall film to be of a high level, consequently leading deterioration in the formability after lamination.

While no particular limitations are placed for a manufacturing method for the film itself (including a multilayer film), an example method is described hereunder. After individual polyester resins are dried by necessity, a resin and/or individual resins are fed into a well-known molten-lamination extruder. Then, the resin is extruded from a slit-shaped die in a sheet-like shape. The sheet-like resin is then adhesively placed on the surface of a casting drum by using an electrostatic application technique or the like so as to be cooled and solidified. Thereby, an unoriented sheet is obtained.

The unoriented sheet is then stretched or oriented in the direction of the film length and the direction of the film width, whereby a biaxially oriented film is obtained. The orientation ratio may be arbitrarily set corresponding to, for example, the degree of orientation, strength, and elasticity of the objective film. In view of quality, however, the ratio is preferably set by using a tenter technique. Particularly, a sequential biaxial orientation technique and a sequential biaxial orientation technique are preferable. In the former technique, a material is oriented in the longitudinal direction and is then oriented in the width direction. In the synchronous biaxial orientation technique, a material is oriented synchronously in both the longitudinal and width direction.

Subsequently described hereinbelow is a method for manufacturing a laminate metal sheet in stages where the films are laminated over the metal sheet. The present case of the invention employs a method in which a metal sheet is heated to a temperature exceeding the melting point of the film, and a compressively bonding rolls (which hereinbelow will be referred to as "laminate rolls") are used to render the resin film to be in contact with two surfaces of the metal sheet and to then be laminated (thermally fusion bonded) thereonto.

Laminating conditions are not particularly limited as long as they are appropriate to enable film structure restricted by Embodiment 5 to be obtained. For example, preferably, the temperature at laminating commencement time is set to 280° C. or higher, and the time in which the film is in contact at a temperature higher than the melting point thereof is set to a range of 1 to 20 msec as a history of temperatures applied to the film at the time of lamination. To achieve the laminating conditions, not only high-speed lamination, but also cooling during adhesion is necessary.

While the pressure to be applied at the time of lamination is not particularly limited, it is preferably in a range of 1 to 30 $kgf/cm^2$ as a surface pressure. If the pressure value is excessively low, even at a temperature not lower than the melting point, since the time is short, securing sufficient adhesion property is difficult. In contrast, at an excessively high pressure, while no inconveniences take place in performance of the laminate metal sheet, the force exerted on the laminate roll is large. Accordingly, since high strengths are required for relevant facilities, larger facilities are required. This is uneconomical.

For the metal sheet, an aluminum sheet, low carbon steel sheet, or the like that is widely used as a can material may be used. Particularly, for example, a surface-treated steel sheet (one of so-called "TFS" sheets) formed of two layer films made, wherein the lower layer is formed of a metalchrome and the upper layer is formed of a chromium hydroxide substance material, is most suitable.

Deposition amounts of the metalchrome layer and chromium hydroxide substance layer of the TFS are not particularly limited. However, in view of postprocessing adhesion property and anticorrosion resistance, the deposition amounts in Cr conversion are preferably in a range of 70 to 200 mg/m$^2$ for metalchrome layer and in a range of 10 to 30 mg/m$^2$.

EXAMPLE

A chromium plated steel sheet was manufactured using a steel sheet that has a thickness of 0.18 mm and a width of 977 mm and that was cold-rolled, annealed, and then temper-rolled. The steel sheet was then subjected to degreasing, acid-cleaning, and chromium plating. The chromium plating was conducted in a chromium plating bath containing $CrO^3$, $F^-$, and $SO_4^{2-}$, was subjected to intermediate rinsing, and was then subjected to electrolysis using a chemical treatment liquid containing $CrO_3$ and $F^-$. At this event, electrolysis conditions (such as the electric density and electricity quantity) were adjusted to thereby adjust the metalchrome deposition amount and the chromium-hydroxide-substance deposition amount to 120 mg/m$^2$ and 15 mg/m$^2$, respectively.

Subsequently, laminate metal strips were manufactured by using a laminating apparatus shown in FIG. 2. A chromium plated steel sheet 1 of the type obtained as described above was heated using a metal-strip heating apparatus 2. Laminate rolls 3 were used to laminate individual resin films 4a and 4b, as shown in Table 1, on surfaces of the chromium plated steel sheet 1. Specifically, on one of the surfaces of the chromium plated steel strip 1, the resin film 4a was laminated as a resin film (resin film B) to be positioned on the inner surface side of the container after formation of the container. On the other surface, the resin film 4b was laminated (thermally fusion-bonded) as a resin film (resin film A) to be positioned on the outer surface side of the container after formation of the container. The resin film 4a, which is to be positioned on the outer surface side of the container after formation of the container, was manufactured using a material of the resin film 4b to which the wax is added. The contents of the laminated resin films are shown in Table 1. The laminate roll 3 is of an internal water cooled type, whereby cooling water was forcedly circulated during lamination to perform cooling during bonding of the film.

Characteristics of the used biaxially oriented polyester films were measured and evaluated in manners described in (1) to (3) below. Characteristics of the laminate metal plate manufactured in the above-described technique are measured and evaluated in manners described in (4) to (7) below. Films in (1) and (2) are prelamination material films, and the characteristics thereof do not vary even after lamination.

(1) Amorphous Young's Modulus

Amorphous Young's moduli were each measured in accordance with ASTM-D882-81 (A method). The fracture elongation percentage at this event was used as the elongation percentage. An amorphous Young's modulus (Ea) was calculated from a Young's modulus (Ef) in accordance with the following equation:

$$Ea=(1-\Phi)Ef$$

In the equation, $\Phi$ represents crystalinity, and it is calculated using the following equation in accordance with a film density ($\rho$) measured using a density gradient tube:

$$\Phi=(\rho-1.335)/0.12$$

(2) Intrinsic Viscosity of Polyester

Polyesters used for individual layers of two-layer PET were dissolved into orthochlorophenol, the intrinsic viscosities were measured at 25° C. Then, the difference between intrinsic viscosities of the layers was obtained.

(3) Birefringence of Polyester Film

Using a polarizing microscope, a measurement was performed to obtain the retardation in the cross-sectional direction of the resin film after removal of the metal sheet of the laminate metal plate. Based on the result, the birefringence in the cross-sectional direction of the film was measured.

(4) Content-Substance Releasability

At a drawing step, by using a drawing and forming machine, the laminate metal plate was formed into cups under conditions in which a blank diameter is set to 100 mm and a draw ratio (preformation diameter/postformation diameter) is set to 1.88. Subsequently, a content substance made by uniformly mixing eggs, meat, and oatmeal was filled into each of the formed cups, a lid was spin-pressed down onto the cup, and a retorting process (130° C.×90 minutes) was conducted. Thereafter, the lid was taken off, the cup was turned upside down, the content substance was released, and the level of the content substance remaining in the cup was observed. The cup was then shaken a couple of times with hand, and the content substance was retrieved. Then, the state including the amount of remaining part of the content substance in the cup's internal side was observed. In this manner, the degree of the content-substance releasability was evaluated.

Evaluations

⊚: Condition in which the content substance can easily be released without sticking part being remained on the inner surface of the cup after releasing.

○: Condition in which it is difficult to release the content substance just by shaking the cup with hand; however, the content substance can easily be released using a spoon or a similar implement with substantially no sticking part being remained on the inner surface of the cup after releasing.

x: Condition in which it is difficult to release the content substance just by shaking the cup, the content substance cannot be released unless it is moved out using a spoon or other implement, and much part still remaining on the inner surface of the cup is recognizable even after the move-out action.

(5) Formability

After wax application over the laminate metal plate, circular sheets each having a diameter of 179 mm were punched out, and shallow-drawn cups were thereby obtained at a draw ratio of 1.60. Subsequently, redrawing processes were performed for the individual cups at a draw ratio of 2.10 and a draw ratio of 2.80. Then, doming is performed therefor according to a known technique, trimming is performed, and neckin-flanging processing is then performed. Thereby, deep-drawn cups were obtained. The damage degree of each of the films was visually observed paying attention to the neckin portion of each deep-drawn cup thus obtained.

(Evaluations)

⊚: A condition in which no damage nor film-peeling is recognized in the postformation film.

○: A condition in which formation is possible, but slight film-peeling recognized.

Δ: A condition in which formation is possible, but apparent film-peeling is recognized.

x: A condition in which the can body broken to an extent that formation is impossible.

(6) Adhesion Property

Regarding cans having been formable in (5), peel-testing samples (width 15 mm×length 120 mm) were each cut out from a can body portion. A portion of the film was peeled off from a long-side end portion of the cut-off sample, and the film in the peeled off portion was opened in the direction opposite to the chromium plated steel sheet (angle: 180°) wherefrom the film was peeled off. Then, using a tensile tester, peel testing was conducted for the peeled-off film at a tensile speed of 30 mm/min, and the adhesion per width of 15 mm was evaluated. The adhesion-measurement object surface was selected from the inner surface side of the can.

(Evaluations)

◎: 1.47 N/15 mm or higher (0.15 kgf/15 mm or higher)

○: 0.98 N/S15 mm or higher, and lower than 1.47 N/15 mm (0.10 kgf/15 mm or higher, and lower than 0.15 kgf/15 mm)

x: Lower than 0.98 N/15 mm (lower than 0.10 kgf/15 mm)

(7) Impact Resistance

For cans having been formable in (5), the cans were each filled with water, 10 cans each per testing were dropped onto a vinyl-chloride tiled floor from a portion of a height of 1.25 m. Thereafter, a voltage of 6 V was applied to electrodes and the metal cans, current values were read out after three seconds, and average values were obtained in units of tested 10 cans.

(Evaluations)

◎: Lower than 0.01 mA

○: 0.01 mA or higher, lower than 0.05 mA

Δ: 0.05 mA or higher, lower than 0.01 mA x: 0.1 mA or higher (8) Retort-Whitening Resistance For cans having been formable in (5), water was fully poured, the lid was spin-pressed down thereonto, the cans were kept in compressed steam at 125° C. for 30 minutes, and the bottom walls and the can bodies were visually determined for the whitened level in accordance with the following criteria:

◎: No variations were recognized.

○: Substantially no variations are recognized.

Δ: Slight whitening is locally recognized.

x: Whitening is recognized overall.

The evaluation results are shown in Table 11. As shown in Tables 10 and 11, any inventive example of Embodiment 5 exhibited high characteristics in the content-substance releasability, formability, adhesion property, impact resistance, and retort-whitening resistance. In Table 10, notes 1) to 4) indicate as follows:

1) PET: Polyethylene terephthalate
2) Stearyl stearate: Ester stearate (C18-C18)
3) MD: Longitudinal direction; TD: Perpendicular direction
4) The wax added only to the resin film that is to be positioned on the outer surface side of the container.

Among inventive examples, those with an amorphous Young's modulus in range of 140 to 200 kg/mm² exhibited relatively high formability. Relatively higher formability was attained in the case of having a region where the value of the film birefringence is 0.02 or lower is smaller than 5 μm in thickness from the contact interface with the metal sheet. In addition, the impact resistance and the flavor-retaining characteristics were found relatively higher in the case where 95 mol % of the polyester units constituting the film are ethylene terephthalate units.

In comparison, however, comparative examples out of the scope of Embodiment 5 were found to be deficient in any one of the content-substance releasability, formability, and impact resistance.

TABLE 10

| Category | Film | Ethylene terephthalate unit (mol %) | Wax[4] Type | Wax[4] Addition amount (% by mass) | Film thickness (μm) | Intrinsic viscosity | Amorphous Young's modulus MD[2] (kg/mm²) | Amorphous Young's modulus TD[3] (kg/mm²) | Elongation percentage MD[2] (%) | Elongation percentage TD[3] (%) | Layer thickness of post-lamination film region where birefringence is 0.02 or lower (μm) |
|---|---|---|---|---|---|---|---|---|---|---|---|
| Inventive example 1 | PET[1] | 98 | Carnauba | 0.50 | 15 | — | 172 | 184 | 228 | 228 | 2 |
| Inventive example 2 | PET | 97 | Carnauba | 0.75 | 15 | — | 150 | 164 | 241 | 234 | 2 |
| Inventive example 3 | PET | 95 | Carnauba | 0.10 | 15 | — | 181 | 192 | 218 | 201 | 2 |
| Inventive example 4 | PET | 98 | Carnauba | 1.50 | 15 | — | 171 | 185 | 225 | 222 | 2 |
| Inventive example 5 | PET | 98 | Stearyl stearate[2] | 0.50 | 15 | — | 182 | 194 | 220 | 202 | 2 |
| Inventive example 6 | PET | 98 | Stearyl stearate | 0.75 | 15 | — | 174 | 187 | 229 | 218 | 2 |
| Inventive example 7 | PET | 98 | Silicone | 1.50 | 15 | — | 180 | 192 | 221 | 205 | 2 |
| Inventive example 8 | PET | 98 | Carnauba | 0.50 | 15 | — | 205 | 215 | 170 | 172 | 2 |
| Inventive example 9 | PET | 98 | Carnauba | 0.50 | 15 | — | 125 | 135 | 260 | 253 | 2 |
| Inventive example 10 | PET | 98 | Carnauba | 0.50 | 15 | — | 172 | 184 | 227 | 225 | 2 |
| Inventive example 11 | PET | 85 | Carnauba | 0.50 | 15 | — | 172 | 184 | 225 | 224 | 2 |

TABLE 10-continued

| | | Material film | | | | | | | | | Layer thickness of post-lamination film region where birefringence is 0.02 or lower (μm) |
|---|---|---|---|---|---|---|---|---|---|---|---|
| | | Ethylene terephthalate unit (mol %) | Wax[4] | | Film thickness (μm) | Intrinsic viscosity | Amorphous Young's modulus | | Elongation percentage | | |
| | | | Type | Addition amount (% by mass) | | | MD[2] (kg/mm²) | TD[3] (kg/mm²) | MD[2] (%) | TD[3] (%) | |
| Category | Film | | | | | | | | | | |
| Inventive example 12 | PET | 98 | Carnauba | 0.50 | 25 | — | 172 | 184 | 227 | 223 | 2 |
| Inventive example 13 | PET | 97 | Carnauba | 0.50 | 12 | — | 172 | 184 | 224 | 228 | 2 |
| Inventive example 14 | PET | 98 | Carnauba | 0.50 | 15 | — | 172 | 184 | 228 | 226 | 4 |
| Inventive example 15 | PET | 98 | Carnauba | 0.50 | 15 | — | 172 | 184 | 223 | 227 | 1 |
| Inventive example 16 | PET | 98 | Carnauba | 0.50 | 15 | — | 172 | 184 | 225 | 225 | 8 |
| Inventive example 17 | Two-layer PET | 98 | Carnauba (Addition only to upper layer) | 0.50 | 1(upper layer)/ 14(lower layer) | 0.07 | 172 | 184 | 221 | 224 | 2 |
| Inventive example 18 | Two-layer PET | 98 | Carnauba (Addition only to upper layer) | 0.75 | 3(upper layer)/ 12(lower layer) | 0.18 | 172 | 184 | 224 | 228 | 2 |
| Comparative example 1 | PET | 98 | — | — | 15 | — | 182 | 194 | 219 | 208 | 2 |
| Comparative example 2 | PET | 98 | Carnauba | 0.05 | 15 | — | 182 | 194 | 215 | 205 | 2 |
| Comparative example 3 | PET | 98 | Stearyl stearate | 0.05 | 15 | — | 182 | 194 | 217 | 206 | 2 |
| Comparative example 4 | PET | 98 | Carnauba | 0.50 | 15 | — | 230 | 241 | 117 | 109 | 2 |
| Comparative example 5 | PET | 85 | Carnauba | 0.50 | 15 | — | 90 | 101 | 295 | 279 | 2 |

TABLE 11

| No. | Evaluation result | | | | |
|---|---|---|---|---|---|
| | Content-substance releasability | Formability | Adhesion property | Impact resistance | Retort-whitening resistance |
| Inventive example 1 | ◎ | ◎ | ◎ | ◎ | ◎ |
| Inventive example 2 | ◎ | ◎ | ◎ | ◎ | ◎ |
| Inventive example 3 | ○ | ◎ | ◎ | ◎ | ◎ |
| Inventive example 4 | ◎ | ◎ | ◎ | ◎ | ◎ |
| Inventive example 5 | ◎ | ◎ | ◎ | ◎ | ◎ |
| Inventive example 6 | ◎ | ◎ | ◎ | ◎ | ◎ |
| Inventive example 7 | ○ | ◎ | ◎ | ◎ | ◎ |
| Inventive example 8 | ◎ | ○ | ◎ | ◎ | ○ |
| Inventive example 9 | ◎ | ○ | ◎ | ◎ | ○ |
| Inventive example 10 | ◎ | ◎ | ◎ | ◎ | ◎ |
| Inventive example 11 | ◎ | ◎ | ◎ | ○ | ◎ |
| Inventive example 12 | ◎ | ◎ | ◎ | ◎ | ◎ |
| Inventive example 13 | ◎ | ◎ | ◎ | ◎ | ◎ |
| Inventive example 14 | ◎ | ◎ | ◎ | ◎ | ◎ |
| Inventive example 15 | ◎ | ◎ | ◎ | ◎ | ◎ |
| Inventive example 16 | ◎ | ○ | ◎ | ◎ | ◎ |
| Inventive example 17 | ◎ | ◎ | ◎ | ◎ | ◎ |
| Inventive example 18 | ◎ | ◎ | ◎ | ◎ | ◎ |
| Comparative example 1 | X | ◎ | ◎ | ◎ | ◎ |
| Comparative example 2 | X | ◎ | ◎ | ◎ | ◎ |
| Comparative example 3 | X | ◎ | ◎ | ◎ | ◎ |
| Comparative example 4 | ◎ | Δ | ○ | ◎ | X |
| Comparative example 5 | ◎ | ◎ | ◎ | Δ | ◎ |

What is claimed is:

1. A film-laminated metal sheet for a container comprising a metal sheet and laminated resin films, each resin film containing a polyester as a main component of an inner surface of the container and an outer surface of the container, said metal sheet being disposed between a resin film formed on an inner surface of said metal sheet and a resin surface formed on an outer surface of said metal sheet, wherein a polarity force component $Ys^h$ of a surface free energy of a surface of the resin film that is to be positioned on an inner surface side of the container after formation of the container and that is to be in contact with a content of the container is less than $2.0 \times 10^{-3}$ N/m, the resin film to be positioned on the inner surface side of the container after formation of the container and/or the resin film to be positioned on the outer surface side of the container after formation of the container contains a color pigment or a color dye, and the resin film to be positioned on the inner surface side of the container further contains 0.80 mass % to 2.0 mass % of a wax component with respect to the resin film.

2. The film-laminated metal sheet according to claim 1, wherein the resin film to be positioned on the inner surface side of the container contains the colorant 10 mass % to 30 mass % with respect to the resin film.

* * * * *